(12) United States Patent
Hyodo et al.

(10) Patent No.: US 8,085,317 B2
(45) Date of Patent: Dec. 27, 2011

(54) INFORMATION PROCESS APPARATUS AND METHOD, PROGRAM RECORD MEDIUM, AND PROGRAM

(75) Inventors: Kenji Hyodo, Kanagawa (JP); Masaki Hirose, Tokyo (JP); Hideaki Mita, Hyogo (JP); Hiroshi Saitou, Osaka (JP); Tatsushi Bannai, Osaka (JP)

(73) Assignees: Sony Corporation, Tokyo (JP); Matsushita Electric Industrial Co., Ltd., Osaka (JP)

( * ) Notice: Subject to any disclaimer, the term of this patent is extended or adjusted under 35 U.S.C. 154(b) by 1208 days.

(21) Appl. No.: 10/559,953

(22) PCT Filed: Jun. 9, 2004

(86) PCT No.: PCT/JP2004/008410
§ 371 (c)(1),
(2), (4) Date: Jul. 5, 2007

(87) PCT Pub. No.: WO2004/112029
PCT Pub. Date: Dec. 23, 2004

(65) Prior Publication Data
US 2010/0278511 A1    Nov. 4, 2010

(30) Foreign Application Priority Data
Jun. 11, 2003    (JP) .................... 2003-166314

(51) Int. Cl.
*H04N 5/76* (2006.01)
*H04N 9/80* (2006.01)
(52) U.S. Cl. ............... 348/231.2; 386/239; 386/247; 386/353

(58) Field of Classification Search ........... 348/143, 348/153, 231.2; 386/239, 247, 353
See application file for complete search history.

(56) References Cited

U.S. PATENT DOCUMENTS

| 5,806,072 | A * | 9/1998 | Kuba et al. ........................ 1/1 |
| 2002/0131764 | A1* | 9/2002 | David et al. ..................... 386/69 |
| 2002/0164149 | A1* | 11/2002 | Wilkinson ....................... 386/46 |
| 2003/0085997 | A1* | 5/2003 | Takagi et al. ................... 348/143 |

FOREIGN PATENT DOCUMENTS

| JP | 5 325500 | 12/1993 |
| JP | 5-325500 | 12/1993 |
| JP | 6-149905 | 5/1994 |
| JP | 9-213056 | 8/1997 |
| JP | 2001-75869 | 3/2001 |
| JP | 2002 25230 | 1/2002 |
| JP | 2002-25230 | 1/2002 |

* cited by examiner

*Primary Examiner* — Thai Tran
*Assistant Examiner* — Mishawn Dunn
(74) *Attorney, Agent, or Firm* — Frommer Lawrence & Haug LLP; William S. Frommer; Thomas F. Presson

(57) ABSTRACT

A data generation section generates an essence data file composed of a file header, a file body, and a file footer. A header size obtainment section obtains header size information of essence data file from the data generation section, and supplies the header size information to a clip generation section and an index file update section. The clip generation section generates a clip information file that describes the header size information supplied from the header size obtainment section. The index file update section registers a clip element that describes the header size information supplied from the header size obtainment section to an index file stored in a ROM.

6 Claims, 22 Drawing Sheets

Fig. 9

```
1: <?xml version="1.0" encoding="UTF-8" ?>
2: <indexFile xmlns="urn:schemas-professionalDisc:index:2003"
3:     xmlns:xsi="http://www.w3.org/2001/XMLSchema-instance"
4:     xsi:noNamespaceSchemaLocation="index.xsd">
5: + <clipTable path="/PROAV/CLPR/"/>
6: + <editlistTable path="/PROAV/EDTR/"/>
7: </indexFile>
```

Fig. 10

```
1:  <clipTable path="/PROAV/CLPR/">
2:  + <clip id="C0001"
3:      umid="0123456789ABCDEF0123456789ABCDEF0123456789AA"
4:      file="C0001C01.SMI" fps="59.94i" dur="12001" ch="4"
5:      aspectRatio="4:3">
6:  + <clip id="C0002"
7:      umid="0123456789ABCDEF0123456789ABCDEF0123456789AB"
8:      file="C0002C01.SMI" fps="59.94i" dur="4000" ch="4"
9:      aspectRatio="4:3">
10: + <clip id="C0003"
11:     umid="0123456789ABCDEF0123456789ABCDEF0123456789AC"
12:     file="C0003C01.SMI" fps="59.94i" dur="100000" ch="4"
13:     aspectRatio="4:3">
14: + <clip id="C0004"
15:     umid="0123456789ABCDEF0123456789ABCDEF0123456789AD"
16:     file="C0004C01.SMI" fps="59.94i" dur="12001" ch="4"
17:     aspectRatio="16:9">
18: </clipTable>
```

Fig. 11

```
 1: <clip id="C0001" umid="0123456789ABCDEF0123456789ABCDEF0123456789AA"
 2:    file="C0001C01.SMI" fps="59.94i" dur="12001" ch="4" aspectRatio="4:3">
 3:    <video umid="0123456789ABCDEF0123456789ABCDEF0123456789A1"
 4:        file="C0001V01.MXF" type="DV25_411P" header="65536"/>
 5:    <audio umid="0123456789ABCDEF0123456789ABCDEF0123456789A2"
 6:        file="C0001A01.MXF" type="LPCM16" header="65536" cast="CH1"/>
 7:    <audio umid="0123456789ABCDEF0123456789ABCDEF0123456789A3"
 8:        file="C0001A02.MXF" type="LPCM16" header="65536" cast="CH2"/>
 9:    <audio umid="0123456789ABCDEF0123456789ABCDEF0123456789A4"
10:        file="C0001A03.MXF" type="LPCM16" header="65536" cast="CH3"/>
11:    <audio umid="0123456789ABCDEF0123456789ABCDEF0123456789A5"
12:        file="C0001A04.MXF" type="LPCM16" header="65536" cast="CH4"/>
13:    <subStream umid="0123456789ABCDEF0123456789ABCDEF0123456789A6"
14:        file="C0001S01.MXF" type="PD-SubStream" header="65536"/>
15:    <meta file="C0001M01.XML" type="PD-Meta"/>
16:    <rtmeta file="C0001R01.BIM" type="std" header="65536"/>
17: </clip>
```

Fig. 12

```
 1: <editlistTable path="/PROAV/EDTR/">
 2: + <editlist id="E0001">
 3:    umid="0123456789ABCDEF0123456789ABCDEF0123456789BB"
 4:    file="E0001E01.SMI" dur="500" fps="59.94i" ch="4"
 5:    aspectRatio="4:3">
 6: + <editlist id="E0002">
 7:    umid="0123456789ABCDEF0123456789ABCDEF0123456789BC"
 8:    file="E0002E01.SMI" dur="500" fps="59.94i" ch="4"
 9:    aspectRatio="4:3">
10: + <editlist id="E0003">
11:    umid="0123456789ABCDEF0123456789ABCDEF0123456789BD"
12:    file="E0003E01.SMI" dur="500" fps="59.94i" ch="4"
13:    aspectRatio="4:3">
14: + <editlist id="E0004">
15:    umid="0123456789ABCDEF0123456789ABCDEF0123456789BE"
16:    file="E0003E01.SMI" dur="500" fps="59.94i" ch="4"
17:    aspectRatio="16:9">
18: </editlistTable>
```

*Fig. 13*

```
1: <editlist id="E0001"
2:   umid="0123456789ABCDEF0123456789ABCDEF0123456789B1"
3:   file="E0001E01.SMI" dur="500" fps="59.94i" ch="4"
4:   aspectRatio="4:3">
5:   <playlist file="E0001P01.SMI"/>
6:   <meta file="E0001M01.XML" type="PD-Meta"/>
7: </editlist>
```

Fig. 14

```
1:  <body>
2:   <par>
3:    <switch>
4:     <!-- main stream -->
5:     <par systemComponent="IMX50">
6:      <video
7:       src="urn:smpte:umid:060A2B34010101050101 0D1213000000012345 6789ABCDE
8:       F" type="IMX50" header="65536"/>
9:      <audio
10:      src="urn:smpte:umid:060A2B34010101050101 0D1213000000012345 6789ABCDEF
11:      0" type="LPCM16" header="65536" trackDst="CH1"/>
12:      <audio
13:      src="urn:smpte:umid:060A2B34010101050101 0D1213000000023456 789ABCDEF0
14:      1" type="LPCM16" header="65536" trackDst="CH2"/>
15:      <audio
16:      src="urn:smpte:umid:060A2B34010101050101 0D1213000000034567 89ABCDEF01
17:      2" type="LPCM16" header="65536" trackDst="CH3"/>
18:      <audio
19:      src="urn:smpte:umid:060A2B34010101050101 0D1213000000045678 9ABCDEF012
20:      3" type="LPCM16" header="65536" trackDst="CH4"/>
```

Fig. 15

```
21:     <audio
22:     src="urn:smpte:umid:060A2B3401010105010100121300000056789ABCDEF0123
23:     4" type="LPCM16" header="65536" trackDst="CH5"/>
24:     <audio
25:     src="urn:smpte:umid:060A2B3401010105010100121300000006789ABCDEF01234
26:     5" type="LPCM16" header="65536" trackDst="CH6"/>
27:     <audio
28:     src="urn:smpte:umid:060A2B3401010105010100121300000000789ABCDEF012345
29:     6" type="LPCM16" header="65536" trackDst="CH7"/>
30:     <audio
31:     src="urn:smpte:umid:060A2B3401010105010100121300000000089ABCDEF0123456
32:     7" type="LPCM16" header="65536" trackDst="CH8"/>
33:       </par>
34:       <!-- sub stream -->
35:       <ref
36:     src="urn:smpte:umid:060A2B3401010105010100121300000000009ABCDEF01234567
37:     8" type="SubStream" header="65536" systemComponent="PD-SubStream"/>
38:     </switch>
39:     <!-- realtime meta -->
40:     <metastream src="C0001R01.BIM" type="std" header="65536"/>
41:   </par>
42: </body>
```

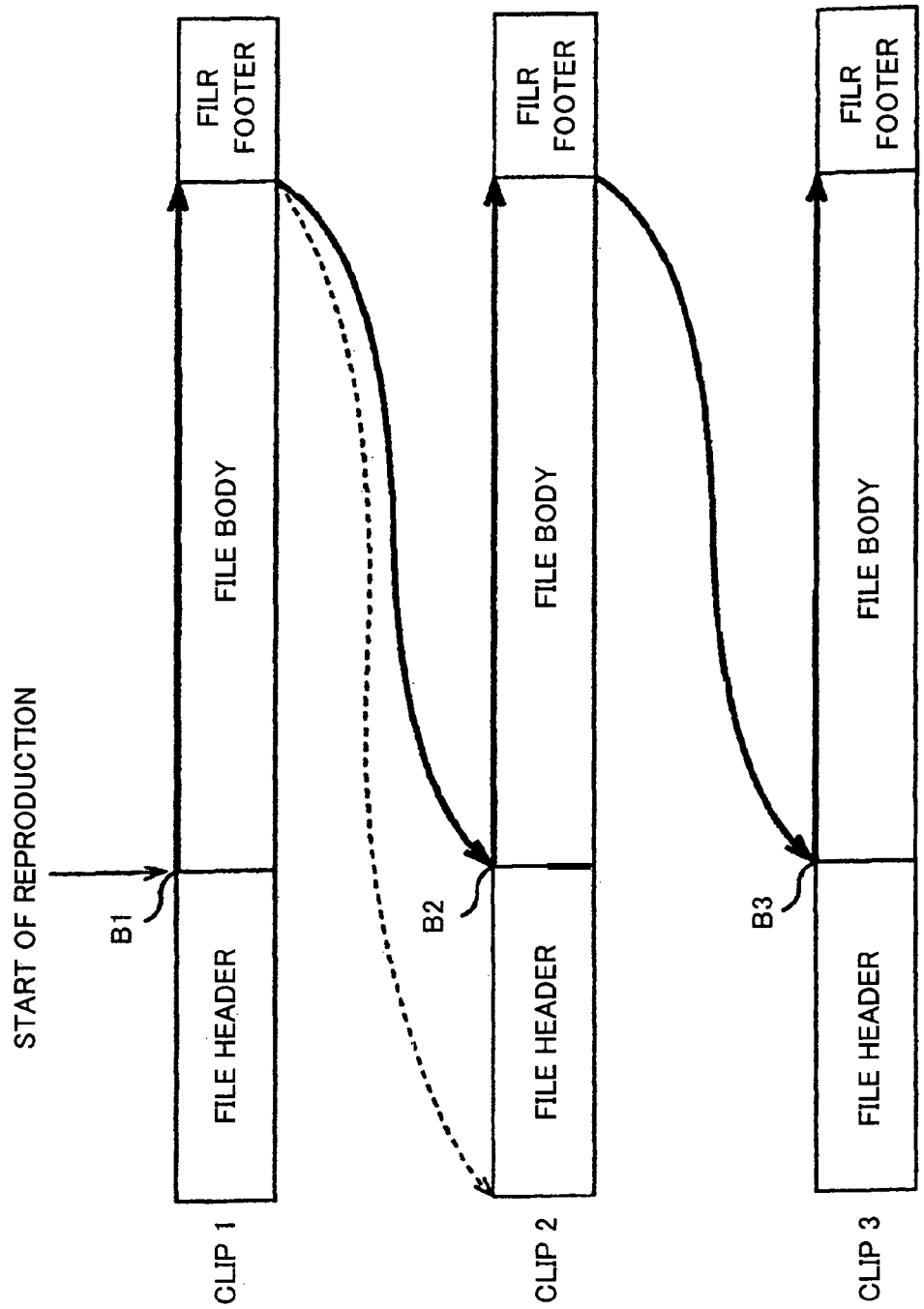

INFORMATION PROCESS APPARATUS AND METHOD, PROGRAM RECORD MEDIUM, AND PROGRAM

TECHNICAL FIELD

The present invention relates to an information process apparatus and method, a program record medium, and a program, in particular, to an information process apparatus and method, a program record medium, and a program that allow data to be smoothly reproduced.

BACKGROUND ART

In recent years, with decreases of the prices of record mediums such as CD-RW (Compact Disc-ReWritable) and DVD-RW (Digital Versatile Disc-ReWritable) that allow data to be repeatedly written and erased, they have been widespread. With these disc-shaped record mediums, fields of video data and audio data can be exchanged between not only personal computers, but business-use broadcasting devices such as AV (Audio Visual) servers and VTRs (Video Tape Recorders).

Conventionally, as formats of files exchanged between broadcasting devices, each model and each maker use a unique format. Thus, it is difficult to exchange files between broadcasting devices of different models or different makers. To solve this problem, as a file exchange format, MXF (Material eXchange Format) has been proposed and is currently being standardized. A file according to this format is composed of a header, a body, and footer. The header describes information about the body. The body contains video data.

Thus, in broadcasting devices, video data and audio data are recorded on a disc-shaped record medium according to this format.

However, when video data and audio data recorded on a disc-shaped record medium according to the foregoing format are reproduced, conventional broadcasting devices read the header, obtain the start position of the body from the header, and read video data of the body from the obtained start position of the body. In other words, in conventional broadcasting devices, unless the header is read, the start position of the body is not obtained. Thus, the body that contains video data cannot be quickly read from the disc-shaped record medium. As a result, the reproduction process cannot be performed with high response.

In addition, when all data recorded on a record medium are tried to be successfully reproduced, after data are reproduced from a particular position, the header of the next data is read from an area apart from the particular position. The start position of the body is obtained from the header. The body needs to be read from the start position of the obtained body. Thus, data of a content to be reproduced next cannot be read when it needs to be reproduced. As a result, the reproduction is stopped. In other words, it is difficult to successfully and smoothly reproduce data of a plurality of contents.

DISCLOSURE OF THE INVENTION

The present invention is made from the foregoing point of view and an object thereof is to smoothly reproduce data.

The present invention is an information process apparatus comprising reproduction information obtainment means for obtaining reproduction information necessary to reproduce data when a body is recorded; data generation means for generating a header according to the reproduction information obtained by the reproduction information obtainment means and adding the header to the body so as to generate the data; header information obtainment means for obtaining header size information of the data generated by the data generation means; and management file registration means for registering management information of the data to a management file with which the data are managed, the management information being composed of the reproduction information obtained by the reproduction information obtainment means and the header size information obtained by the header information obtainment means.

The information process apparatus may further comprise data information obtainment means for obtaining the header size information of the data from the management information registered by the management file registration means; and reproduction means for reproducing the data from the position of which the header size is removed from the beginning of the data according to the header size information obtained by the data information obtainment means.

The information process apparatus may further comprise data information obtainment means for obtaining the header size information of the data from the management information registered by the management file registration means; and successive reproduction means for reproducing all data from the position of which the header size is removed from the beginning of the data according to the header size information obtained by the data information obtainment means.

The management file may totally manage the data recorded on the record medium according to an identifier that uniquely identifies the data and information that represents the recorded position of the data.

The management file may manage the data recorded on the recording medium according to an identifier that uniquely identifies each piece of the data.

The present invention is an information process method comprising the steps of obtaining reproduction information necessary to reproduce data when a body is recorded; generating a header according to the reproduction information obtained by a process of the reproduction information obtainment step and adding the header to the body so as to generate the data; obtaining header size information of the data generated by a process of the data generation step; and registering management information of the data to a management file with which the data are managed, the management information being composed of the reproduction information obtained by the process of the reproduction information obtainment step and the header size information obtained by a process of the header information obtainment step.

The present invention is a program record medium on which a program is recorded, the program comprising the steps of obtaining reproduction information necessary to reproduce data when a body is recorded; generating a header according to the reproduction information obtained by &process of the reproduction information obtainment step and adding the header to the body so as to generate the data; obtaining header size information of the data generated by a process of the data generation step; and registering management information of the data to a management file with which the data are managed, the management information being composed of the reproduction information obtained by the process of the reproduction information obtainment step and the header size information obtained by a process of the header information obtainment step.

The present invention is a program comprising the steps of obtaining reproduction information necessary to reproduce data when a body is recorded; generating a header according to the reproduction information obtained by a process of the reproduction information obtainment step and adding the header to the body so as to generate the data; obtaining header size information of the data generated by a process of the data generation step; and registering management information of the data to a management file with which the data are managed, the management information being composed of the reproduction information obtained by the process of the reproduction information obtainment step and the header size information obtained by a process of the header information obtainment step.

According to the present invention, when the body is recorded, reproduction information necessary to reproduce data is obtained. According to the obtained reproduction information, the header is generated. The header is added to the body. As a result, the data are generated. The header size of the generated data is obtained. Management information of data is composed of the obtained reproduction information and header size information. The management information is registered to a management file that manages data.

BRIEF DESCRIPTION OF DRAWINGS

FIG. 9 is a schematic diagram showing an example of the structure of an index file shown in FIG. 5;

FIG. 10 is a schematic diagram showing an example of a clip shown in line 5 of FIG. 8;

FIG. 11 is a schematic diagram showing an example of a clip element of clip ID ["C0001"] shown in line 2 to line 5 of FIG. 10;

FIG. 12 is a schematic diagram showing an example of an edit list table shown in line 6 of FIG. 9;

FIG. 13 is a schematic diagram showing an example of an edit list element of edit list ID ["E0001"] shown in line 2 to line 5 of FIG. 10;

FIG. 14 is a schematic diagram showing an example of a code of a clip information file shown in FIG. 6;

FIG. 15 is a schematic diagram showing an example of a code of a clip information file shown in FIG. 6;

FIG. 22 is a schematic diagram describing the tape reproduction process shown in FIG. 21.

BEST MODES FOR CARRYING OUT THE INVENTION

Next, embodiments of the present invention will be described. The relationship between the structural elements described in the claims and the embodiments of the present patent application is as follows. This relationship represents that examples that support the claims of the present patent application are described in the embodiments of the present patent application. Thus, even if examples corresponding to the embodiments are not described in this section, the examples should not be construed as those that do not correspond to the structural elements of the claims of the present patent application contrast, even if examples are described in this section as those that correspond to the structural elements of the claims, the examples should not be construed as those that do not correspond to other than the structural elements of the claims of the present patent application.

In addition, the description of this section does not mean that all aspects of the present invention that correspond to the examples described in the embodiments of the present patent application are not described in the claims of the present patent application. In other words, this description does not deny the possibility of which there are aspects of the present invention that are described in the embodiments but not described in the claims of the present patent application, namely aspects of the present invention that may be filed as divisional patent application(s) or aspects of the present invention that may be added as amendments.

Figure 7:
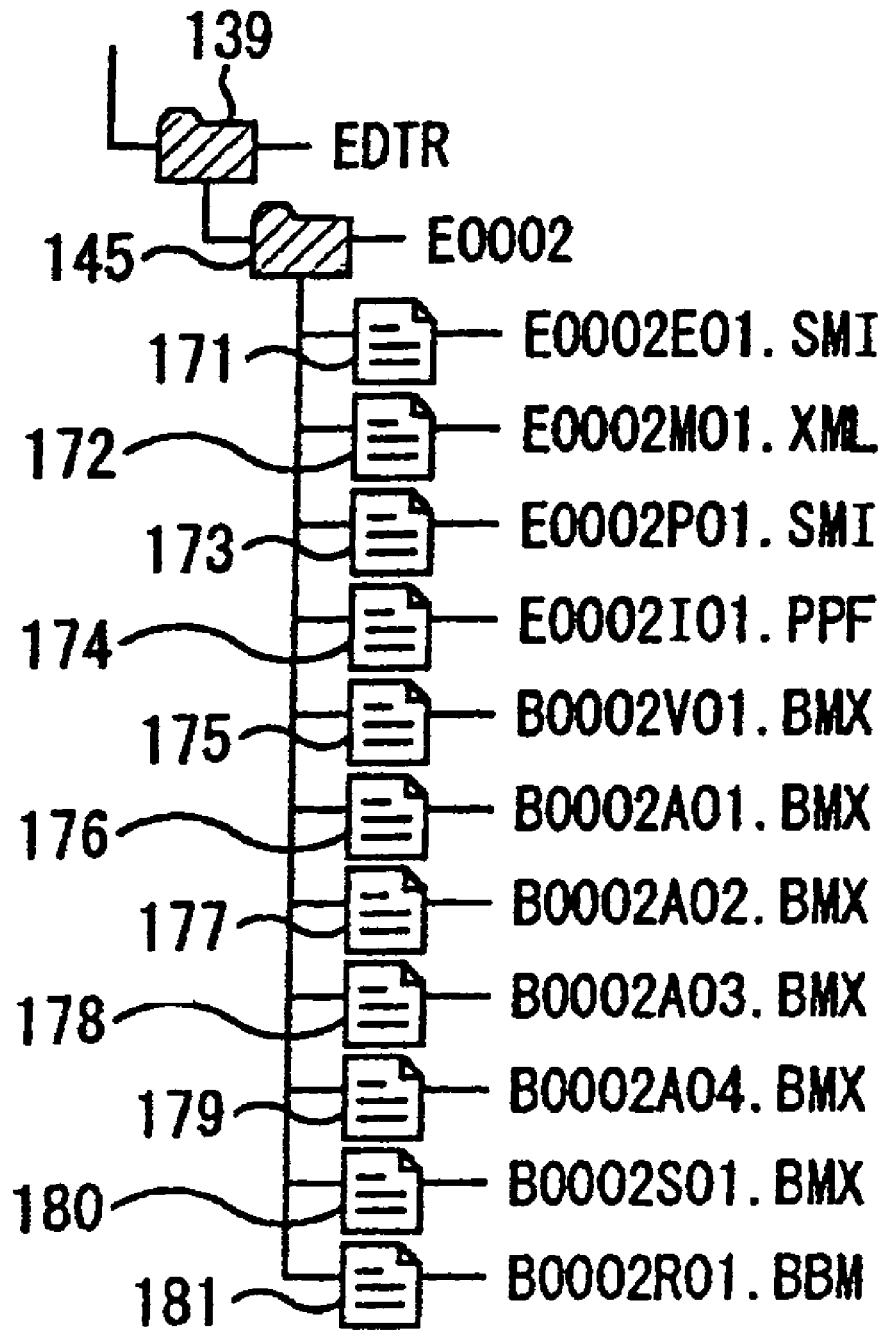
FIG. 7 is a schematic diagram showing an example of the structure of an edit list directory shown in FIG. 5.

An information process apparatus of claim 1 is an information process apparatus (for example, a photographing device 14 shown in FIG. 1) that manages data (for example, a clip composed of a video data file 152 shown in FIG. 7) recorded on a record medium (for example, an optical disc 17 shown in FIG. 1), the data being composed of a header and a body, the information process apparatus comprising reproduction information obtainment means (for example, an information obtainment section 102 shown in FIG. 3) for obtaining reproduction information (for example, resolution of data and type of codec) necessary to reproduce the data when the body is recorded; data generation means (for example, a data generation section 103 shown in FIG. 3) for generating the header according to the reproduction information obtained by the reproduction information obtainment means and adding the header to the body so as to generate the data; header information obtainment means (for example, a header size obtainment section 108 shown in FIG. 3) for obtaining header size information of the data generated by the data generation means; and management file registration means (for example, an index file update section 105 shown in FIG. 3) for registering management information (for example, a clip child element shown in FIG. 11) of the data to a management file (for example, an index file 134 shown in FIG. 5) with which the data are managed, the management information being composed of the reproduction information (for example, [type="DV25_411P"], line 4, FIG. 11) obtained by the reproduction information obtainment means and the header size information (for example, [header="65536"], line 4, FIG. 11) obtained by the header information obtainment means.

Figure 4:
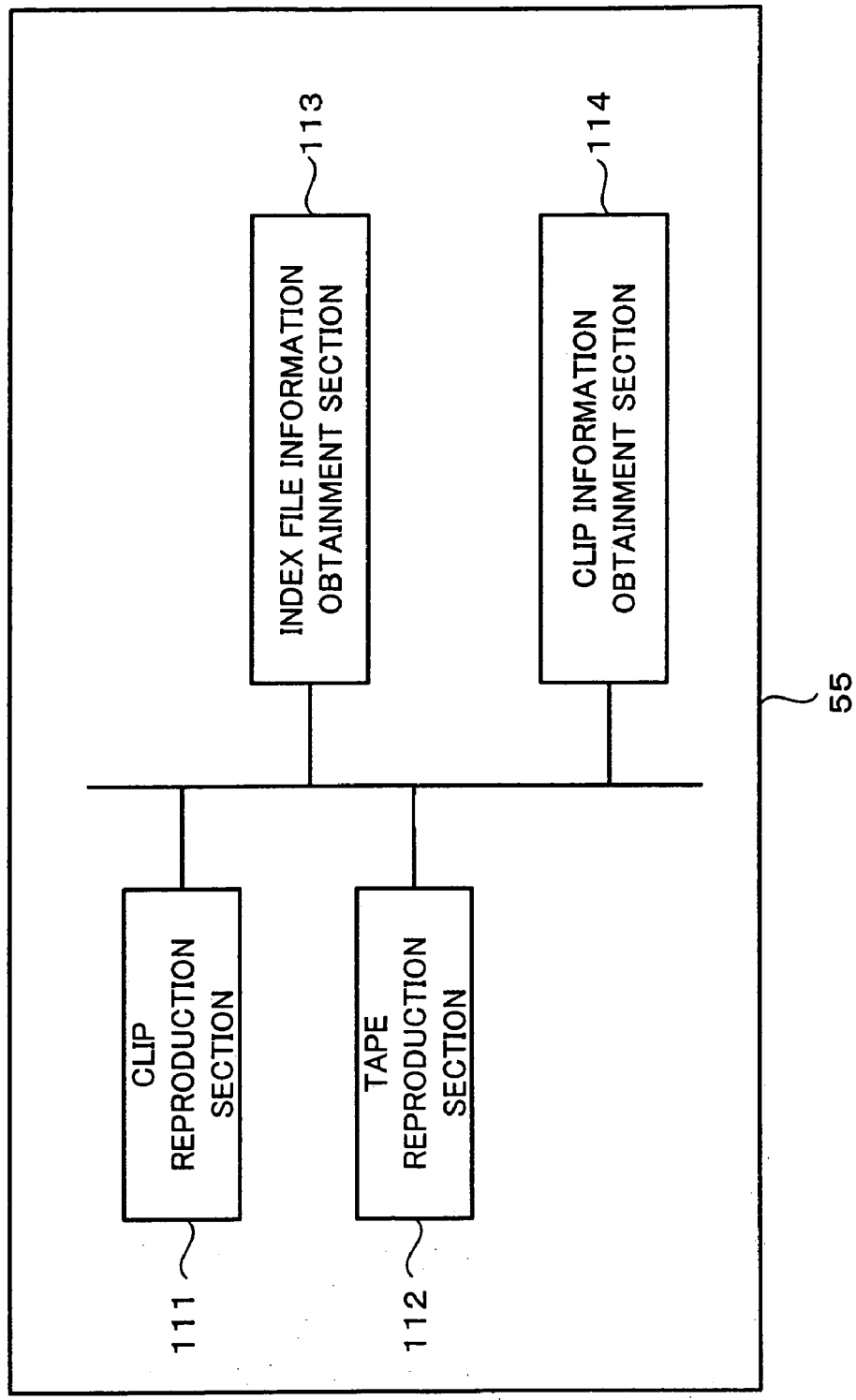
FIG. 4 is a block diagram showing an example of the structure of a reproduction control section shown in FIG. 2.

An information process apparatus of claim 2 is the information process apparatus further comprising data information obtainment means (for example, an index file information obtainment section 113 shown in FIG. 4) for obtaining the header size information of the data from the management information (for example, a clip child element shown in FIG. 11) registered by the management file registration means; and reproduction means (for example, a clip reproduction section 111 shown in FIG. 4) for reproducing the data from the position (for example, position A1 shown in FIG. 20) of which the header size is removed from the beginning of the data according to the header size information obtained by the data information obtainment means.

An information process apparatus of claim 3 is the information process apparatus further comprising data information obtainment means (for example, an index file information obtainment section 113 shown in FIG. 4) for obtaining the header size information of the data from the management information (for example, a clip child element shown in FIG. 11) registered by the management file registration means; and successive reproduction means (for example, a tape reproduction section 112 shown in FIG. 4) for reproducing all data from the position (for example, position B1 shown in FIG. 22) of which the header size is removed from the beginning of the data according to the header size information obtained by the data information obtainment means.

An information process apparatus of claim 4 is the information process apparatus wherein the management file (for example, an index file 134 shown in FIG. 5) totally manages the data recorded on the record medium (for example, an optical disc 17 shown in FIG. 1) according to an identifier (for example, [umid="0123456789ABCDEF0123456789ABCDEF012 3456789A1"], line 3, FIG. 11) that uniquely identifies the data and information (for example, [file="C0001V01.MXF", line 4, FIG. 11) that represents the recorded position of the data.

An information process apparatus of claim 5 is the information process apparatus, wherein the management file (for example, a clip information file 151 shown in FIG. 6) manages the data recorded on the recording medium (for example, an optical disc 17 shown in FIG. 1) according to an identifier (for example, [umid: 060A2B340101010501010D12130000000123456789 ABCDEF0123456789ABCDEF], line 7 and line 8, FIG. 14) that uniquely identifies each piece (for example, clip) of the data.

Figure 17:
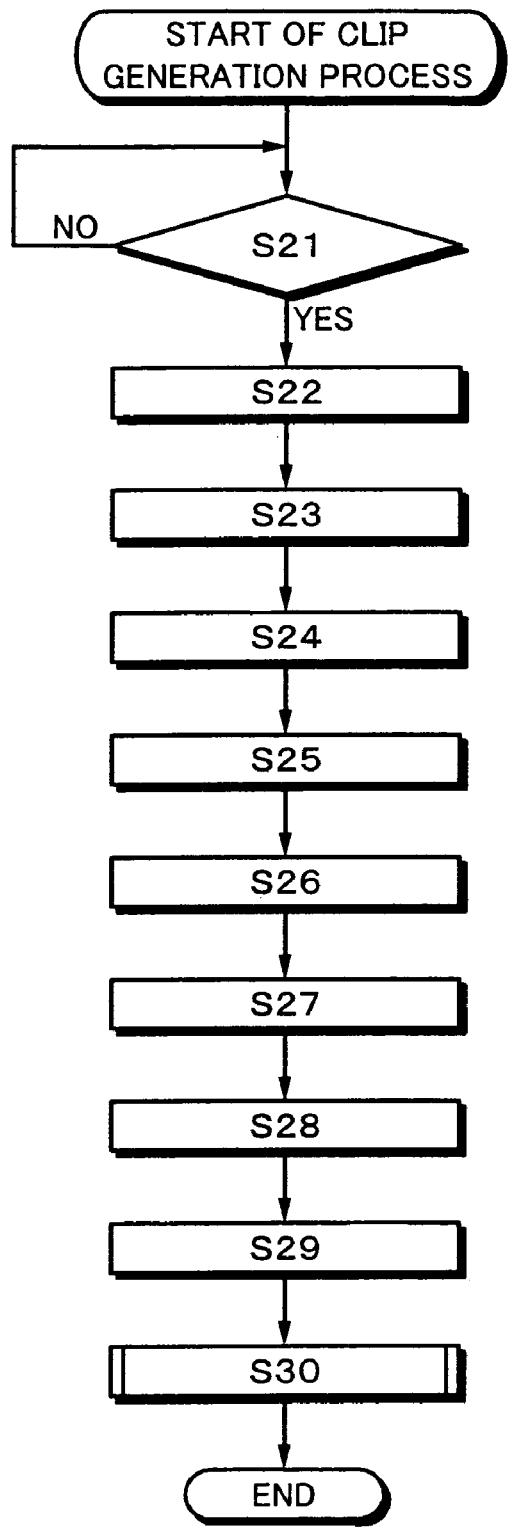
FIG. 17 is a flow chart describing a clip generation process of the photographing device shown in FIG. 1.
Figure 18:
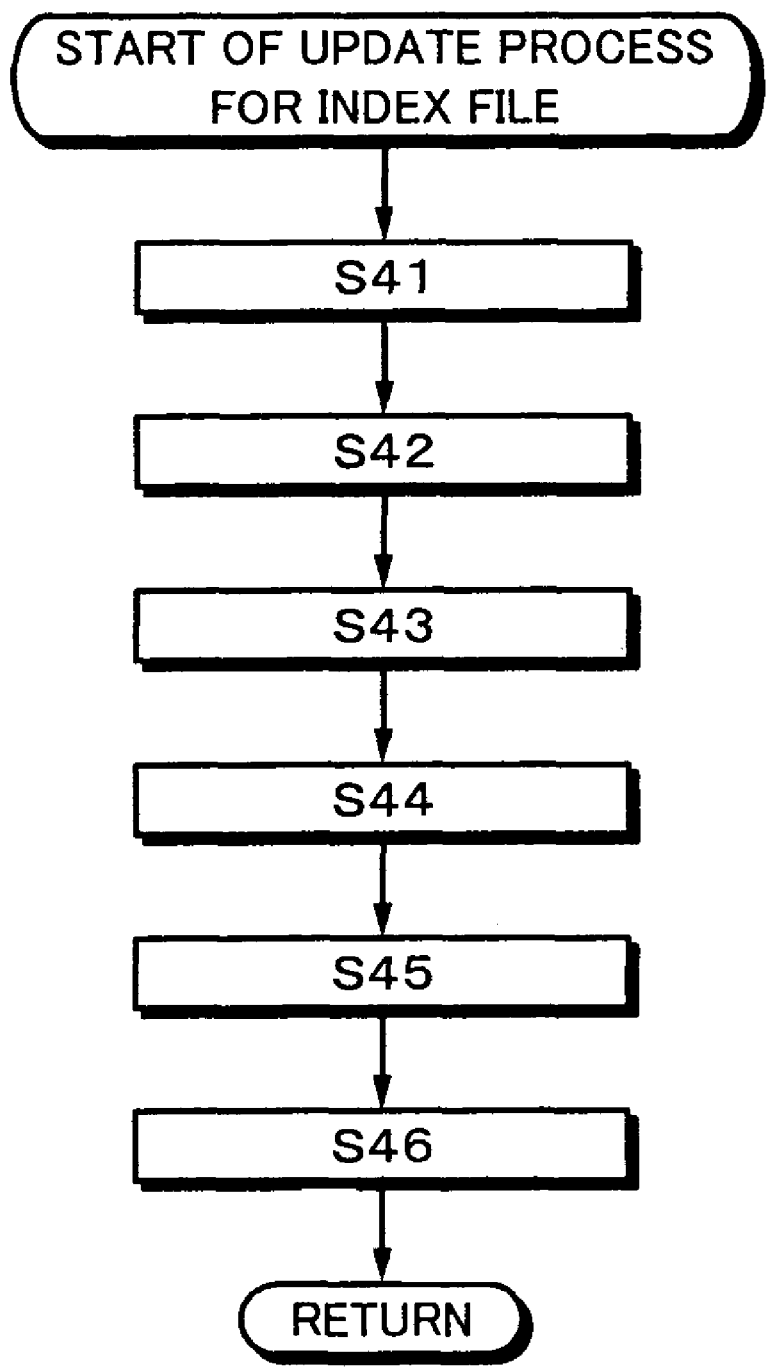
FIG. 18 is a flow chart describing an index file update process at step S30 shown in FIG. 17.

An information process method of the present invention is an information process method of managing data (for example, a clip composed of a video data file 152 shown in FIG. 7) recorded on a record medium (for example, an optical disc 17 shown in FIG. 1), the data being composed of a header and a body, the information process method comprising the steps of obtaining reproduction information (for example, resolution of data and type of codec) necessary to reproduce the data when the body is recorded (for example, at step S22 of FIG. 17); generating the header according to the reproduction information obtained by a process of the reproduction information obtainment step and adding the header to the body so as to generate the data (for example, at step S24 of FIG. 17, obtaining header size information of the data generated by a process of the data generation step (for example, at step S28 of FIG. 17); and registering management information (for example, a clip child element shown in FIG. 11) of the data to a management file (for example, an index file 134 shown in FIG. 5) with which the data are managed, the management information being composed of the reproduction information (for example, [type="DV25_411P"], line 4, FIG. 11) obtained by the process of the reproduction information obtainment step and the header size information (for example, [header="65536", line 4, FIG. 11) obtained by a process of the header information obtainment step (for example, at step S46 of FIG. 18).

A program record medium and a program of the present invention basically have the same structure as the information process method of the present invention. Thus, their description will be omitted to prevent redundancy.

Next, with reference to the accompanying drawings, an embodiment of the present invention will be described.

Figure 1:
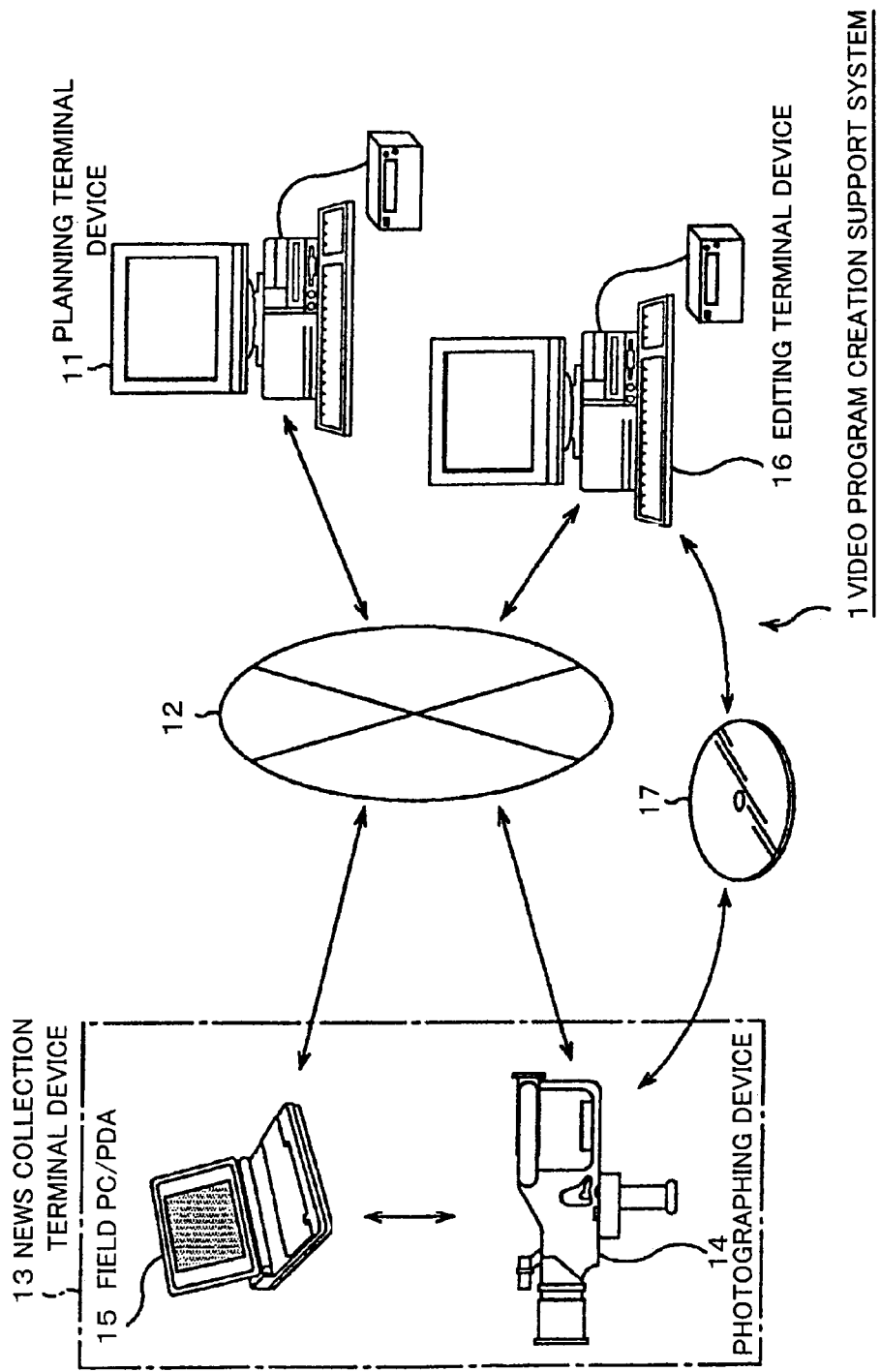
FIG. 1 is a schematic diagram showing an example of the structure of a video program creation support system according to the present invention.

FIG. 1 is a schematic diagram showing an example of the structure of a video program creation support system according to the present invention.

In FIG. 1, a video program creation support system 1 is a system installed in for example a television broadcast station that broadcasts a television signal and a video content creation company that creates video contents of videos and movies. In addition, the video program creation support system 1 is a system with which video programs as video works such as television programs and movies are created. The video program creation support system 1 is a system that allows video programs to be effectively created so that meta data and so forth added to video programs as electronic files can be consistently used among a plurality of departments that share the creation of a video program.

As shown in FIG. 1, the video program creation support system 1 is composed of a planning terminal device 11 with which a video program is planned, a network 12 to which the planning terminal device 11 is connected, a news collection terminal device 13 connected to the network 12, a photographing device 14 that composes the news collection terminal device 13, a field PC/PDA (Personal Computer/Personal Digital Assistants) 15 (hereinafter referred to as the field PC/PDA 15), an editing terminal device 16 connected to the network 12, and an optical disc 17 that is a record medium.

The planning terminal device 11 is composed of an information process device such as a personal compute, its peripheral devices, and so forth. The planning terminal device 11 is installed in a planning and organizing department plans video programs. The planning and organizing department manages the overall creation of a video program, makes a plan thereof, creates a scenario (story) thereof, and assigns creation works to other departments such as a news collection department and an editing department that will be described later. The planning terminal device 11 performs a process that creates construction table meta data that contains policy command information and so forth according to a scenario of each video program in an electronic file format. The planning terminal device 11 supplies the created construction table meta data to the news collection terminal device 13 and so forth through the network 12. In this manner, the planning and organizing department gives commands for news collection and photographic scenes to the news collection department and so forth.

The news collection terminal device 13 is a group of terminal devices used in the news collection department that collects news. The news collection terminal device 13 is composed of for example the photographing device 14 and the field PC 15. The news collection department collects news according to the creation commands received from the planning and organizing department and a scenario on the creation spot. The news collection department photographs pictures of individual scenes that compose a video program and collects photographing conditions.

The photographing device 14 is a video camera such as Camcorder (registered trademark). The photographing device 14 is a device that is used to collect news for a news program and photograph scenes of matches of sports and video contents such as movies. The photographing device 14 is connected to the network 12. The photographing device 14 obtains construction table meta data from the planning terminal device 11 through the network 12. The photographing device 14 displays the obtained construction table meta data in a predetermined display section or the like so that a photographing staff member such as a camera man can recognize scenes that he or she needs to take pictures of. In addition, the photographing staff member operates the photographing device 14 to take pictures of individual scenes that compose a video program according to creation command information of the obtained construction table meta data.

The photographing device 14 records video data and audio data, which were photographed, as an MXF data file based on the MXF (Material eXchange Format) standard, which is a standardized format for files exchanged between broadcasting devices, to a record medium such as the optical disc 17 or the like. Thus, the MXF data file is data compatible among the planning terminal device 11, the photographing device 14, the field PC 15, and the editing terminal device 16, which compose the video program generation support system 1. As will be described in FIG. 8, an MXF data file is composed of a file header, a file body, and a file footer. Since MXF data file is a file based on the MXF standard, essence data (video data, audio data, or the like) are placed on in the file body in the unit of for example 60 (in the case of NSTC) frames.

In addition, at this point, the photographing device 14 records an MXF data file about a video content containing video data, audio data, and so forth corresponding to a clip as a unit of one photographing process to the optical disc 17 and manages the MXF data file as one clip.

In addition, the photographing device 14 records not only original video data as video data that have been photographed, but low resolution video data (hereinafter referred to as the low resolution data) as essence data files contained in clips to the optical disc 17 so as to manage them. Although the data amount of original video data is large, since the resolution thereof is high, they are used as a final video program. In contrast, the low resolution data are video data generated by decreasing the number of pixels of each frame of original video data Thus, the low resolution data are video data of pictures of frames whose number of pixels is small. Although the picture quality of the low resolution data is lower than that of the original video data, since the data amount of the low resolution picture is small, the loads of a transmission process, a reproduction process, and so forth are light. Thus the low resolution data are mainly used for a rough edit process and so forth.

A plurality of clips recorded on the optical disc 17 by the photographing device 14 are managed with an index file that totally manages them (the index file will be described later with reference to FIG. 5) and a clip information file that manages video data, audio data, and so forth that compose a clip (the clip information file will be described later with reference to FIG. 6).

The photographing device 14 displays video data and so forth of a clip recorded on the optical disc 17 in a predetermined display section or the like according to the index file or the clip information file so that the photographing staff member can check whether he or she has took a picture according to the creation command information. In addition, the photographing device 14 is capable of successively displaying a plurality of clips recorded on the optical disc 17 in the predetermined display section or the like according to the index file or the clip information file as if video data recorded on a tape were successively reproduced so that the photographing staff member can successively check a plurality of scenes that he or she has taken.

A clip is a unit that represents not only one photographing process, but a duration from the beginning of the photographing process to the end thereof. In stead, a clip may be a unit that represents the length of one of various types of data obtained in the photographing process. In stead, a clip may be a unit that represents the data amount of one of various types of data obtained in the photographing process. Instead, a clip may represent a set of various types of data.

The optical disc 17 on which a plurality of Clips (MXF data files of video data, audio data, and so forth) have been recorded by the photographing device 14 is carried to for example the editing department, which will be described later, the field PC 15, or the like so that they are used thereby. However, since it takes a time to carry the optical disc 17 to them, the photographing device 14 may supply video data to the planning terminal device 11, the field PC 15, the editing terminal device 16, or the like through the network 12. In this case, it is preferred that the photographing device 14 supply the corresponding low resolution data of the video data that have been photographed because the data amount of the low resolution data is smaller than that of the video data that have been photographed, to shorten the transfer time (lighten the load of the transfer process).

The transfer process for the low resolution data by the photographing device 14 may be performed at any timing. In other words, the transfer process may be performed in parallel with the photographing process. Instead, the transfer process may be performed after the photographing process has been completed.

When the low resolution data are transferred, the editing department can start the editing work in a relatively early stage before the editing department receives the optical disc 17 (for example, while the photographing process is being performed). Thus, the creation efficiency of the video program can be improved. When the low resolution data are transferred through the network 12, the photographing device 14 may record only original video data and audio data (without the low resolution data thereof) to the optical disc 17.

The record medium on which the photographing device 14 records video contents and so forth are not limited to the foregoing optical disc 17. Instead, any type of a record medium may be, used For example, an optical-magnetic disc including MD (Mini-Disc) (registered trademark) or MO (Magneto Optical disc), magnetic disc that includes a flexible disc, a magnetic tape used for DV (Digital Video) and VHD (Video Home System), a semiconductor memory that includes a flash memory, or the like may be used.

The field PC 15 is composed of for example a portable information process device such as a note type personal computer, a PDA, or the like, its peripheral devices, and so forth. The field PC 15 is connected to the photographing device 14 through one of various types of non-wireless and wireless systems. The field PC 15 can share for example construction table meta data, video contents, and so forth with the photographing device 14.

The field PC 15 obtains construction table meta data from the planning terminal device 11 through the network 12 and obtains construction table meta data from the photographing device 14. The field PC 15 displays the obtained construction table meta data in the predetermined display section so that a person in charge of the news collection department can recognize scenes that he or she needs to collect and photograph.

In addition, the field PC 15 generates photography state information that is information about news collection and photography states corresponding to an input of a person in charge of the news collection department as a user and adds the generated photography state information to a related field of the construction table meta data. The photography state information is text data or the like described from various aspects for each take and for each news collection scene. The photography state information is information that will becomes useful when the later editing process is preformed. In such a manner, the field PC 15 edits construction table meta data by writing photography state information to the construction table meta data. In addition, the field PC 15 supplies photography state information as meta data to the photographing device 14 so that the photography state information is added to video data and audio data obtained by the photographing device 14.

The editing terminal device 16 is composed of an information process device such as a personal computer and its peripheral devices. The editing terminal device 16 is installed in the editing department that performs the edit process for video contents. The editing department edits video data and audio data obtained by the photographing device 14 according to creation commands and scenario prepared by the planning and, organizing department, construction table meta data reflected by news collection state of the news collection department and completes a video program.

The editing terminal device 16 obtains construction table meta data and low resolution data from for example the photographing device 14 through the network 12. In addition, the editing terminal device 16 obtains original video data and audio data from the optical disc 17 on which clips (MXF data files of video data, audio data, and so forth) have been recorded. In addition, the editing terminal device 16 can directly obtain a creation command (a command regarding editing) from the planning terminal device 11, the field PC 15, or the like through the network 12.

The editing terminal device 16 suitably reproduces the obtained video content and displays it in the predetermined display section according to the obtained construction table meta data. For example, the user operates the editing terminal device 16 so that it successively displays low resolution data obtained through the network 12 and original video data and audio data as MXF data files from the optical disc 17 according to the scenario, original video data and audio data of all clips recorded on the optical disc 17, or only video data of a desired clip.

When original video data recorded on the optical disc 17 are reproduced, the editing terminal device 16 uses a disc device that is a record and reproduction device that reads data from the optical disc 17 and writes data thereto. At this point, the editing terminal device 16 references the index file or the clip information file, which manages data recorded on the optical disc 17.

The editing terminal device 16 reproduces required video data and so forth in the proper order according to for example construction table meta data and displays the reproduced video data and so forth. In addition, the editing terminal device 16 performs an edit process for video data and so forth that have been obtained by news collection work. The edit process can be categorized as a rough edit process and a main edit process.

The rough edit process is a simple edit process for video data and audio data of MXF data files. For example, when the editing terminal device 16 obtains a plurality of clips in the rough edit process, the editing terminal device 16 selects a clip that will be used in the main edit process, selects (logs) a necessary picture portion from data of the selected clip, sets up the edit start point (In point) and the edit end point (Out point) of the selected picture portion with for example a time code, and extracts (ingests) the corresponding portion from the data of the clip.

The main edit process is a process that connects video data of MXF data files that compose clips for which the rough edit process has been performed, adjusts the final picture quality for the connected video data, and creates perfect package data that are data that will be broadcast as a program.

Like the photographing device 14, the editing terminal device 16 can record video data and audio data, which have been obtained through the network 12 or from another record medium, as MXF data files to the optical disc 17 and manage them as a clip.

There may be plurality of planning terminal devices 11, photographing devices 14, field PCs 15, editing terminal devices 16, and so forth. For example, video data and so forth obtained by a plurality of photographing devices 14 may be obtained by one editing terminal device 16 through the optical disc 17 or the network 12. The photographing device 14 may perform the edit process for the obtained data. Data supplied from one photographing device 14 may be edited by a plurality of editing terminal devices 16.

Although the planning terminal device 11, the photographing device 14, the field PC 15, the editing terminal device 16, and so forth were described as independent devices, parts or all functions of these devices may be mutually integrated.

In addition, besides the planning terminal device 11, the photographing device 14, the field PC 15, and the editing terminal device 16, the video program creation support system 1 may have for example a center server (not shown) connected to the network 12 to configure a client/server system of which the planning terminal device 11, the photographing device 14, the field PC 15, the editing terminal device 16, and so forth are clients.

Figure 2:
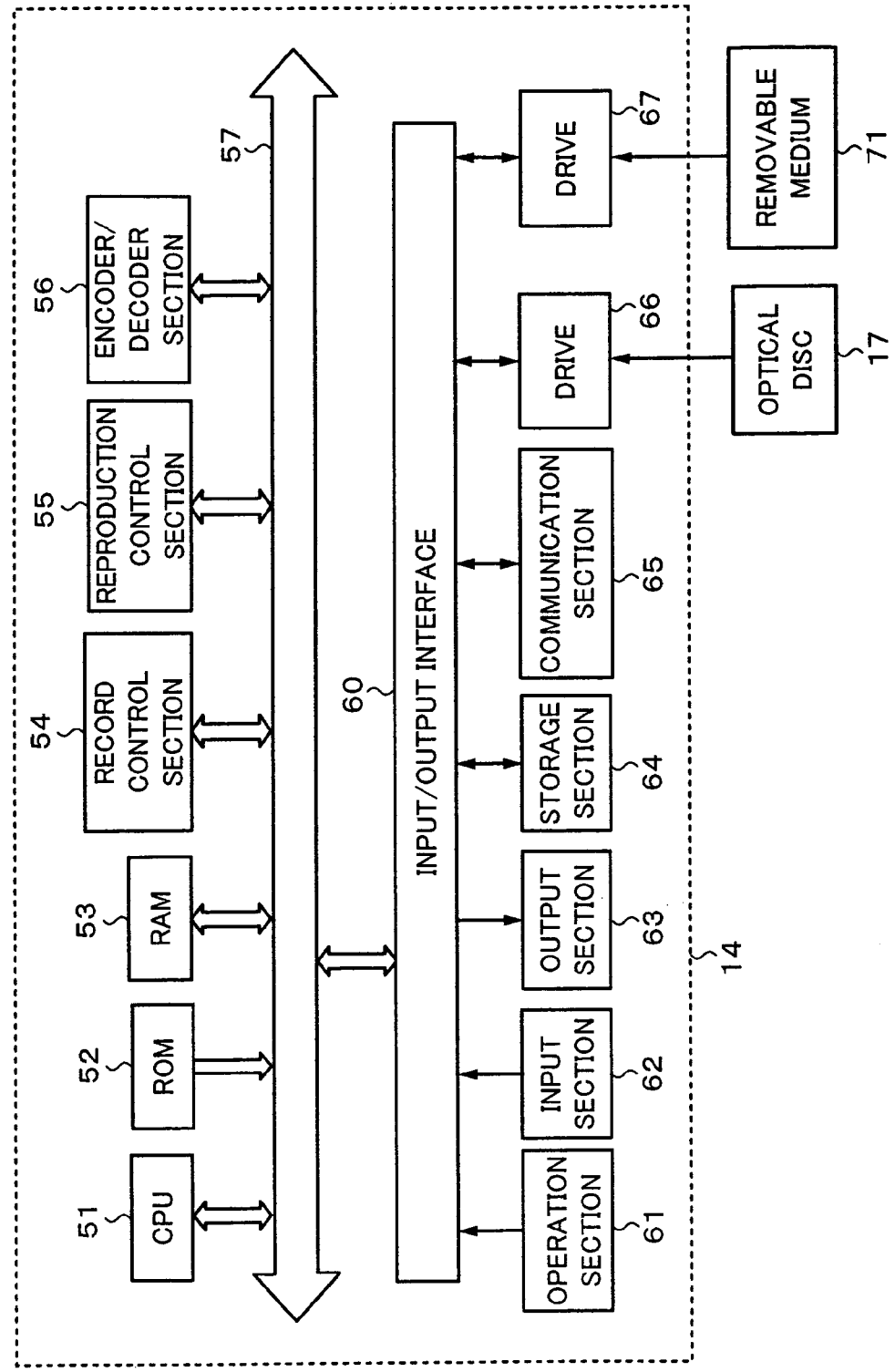
FIG. 2 is a block diagram showing an example of the structure of a photographing device shown in FIG. 1.

FIG. 2 shows an example of the detailed structure of the photographing device 14 shown in FIG. 1. In FIG. 2, a CPU (Central Processing Unit) 51 of the photographing device 14 executes various processes according to a program stored in a ROM (Read Only Memory) 52. When necessary, a RAM (Random Access Memory) 53 stores data, a program, and so forth that the CPU 51 needs to execute various processes.

A record control section 54 controls the recording of video data, audio data, low resolution data, and so forth supplied from an encoder/decoder section 56 or video data, audio data, low resolution data, and so forth stored in a storage section 64 to the optical disc 17 through a drive 66 according to a file system of the optical disc 17 as MXF data files composed of a file header, a file body, and a file footer. Details of the file system will be described later with reference to FIG. 5. Details of the MXF data files will be described with reference to FIG. 8. In the file body of an MXF data file, essence data (video data, audio data, or the like) are recorded in the unit of for example 60 (in the case of NTSC) frames.

A reproduction control section 55 controls the drive 66 according to the file system of the optical disc 17, reads video data, audio data, low resolution data, or the like of the file body of an MXF data file from the optical disc 17, and supplies the video data audio data, low resolution data, or the like read from the optical disc 17 to the encoder/decoder section 56.

The encoder/decoder section 56 encodes video data and audio data that are input from an input section 62 according to a predetermined codec and supplies the encoded video data and audio data to the storage section 64 or the record control section 54. When necessary, the encoder/decoder section 56 encodes the video data are input from the input section 62 according to for example the MPEG4 system, supplies the encoded video data as low resolution data to the storage section 64 or the record control section 54, encodes the audio data that are input from the input section 62 according to for example the ITU-T G.711 A-Law system, and supplies the encoded audio data as low resolution data to the storage section 64 or the record control section 54.

In addition, the encoder/decoder section 56 outputs the video data, audio data, or low resolution data supplied from the reproduction control section 55 to a monitor, a speaker, or the like that composes an output section 63.

The CPU 51, the ROM 52, the RAM 53, the record control section 54, the reproduction control section 55, and the encoder/decoder section 56 are mutually connected through a bus 57. Connected to the bus 57 is also an input/output interface 60.

Connected to the input/output interface 60 is an operation section 61 composed of a keyboard and a mouse. The input/output interface 60 outputs a signal corresponding to an input of the operation section 61 to the CPU 51. Connected to the input/output interface 60 are also the input section 62 composed of a camera that photographs an object and inputs the photographed video data, a microphone that inputs audio data, and so forth, the output section 63 composed of a monitor composed of a CRT (Cathode Ray Tube), an LCD (Liquid Crystal Display), or the like, a speaker, and so forth, a storage section 64 composed of a hard disk, an EEPROM (Electronically Erasable and ProgRAMmable Read Only Memory), and so forth, the communication section 65, and the drive 66.

The communication section 65 is composed of for example an IEEE (Institute of Electrical and Electronics Engineers) 1394 port, a USB (Universal Serial Bus) port, an NIC (Network Interface Card) connected to a LAN (Local Area Network), an analog modem, a TA (Terminal Adaptor), a DSU (Digital Service Unit), an ADSL (Asynchronous Digital Subscriber Line) Modem, or the like. The communication section 65 exchanges data with the editing terminal device 16 through the network 12 for example the Internet or an intranet.

The drive 66 loads and unloads the optical disc 17. By driving the optical disc 17, the drive 66 can record video data and audio data to the optical disc 17 and reproduce video data and audio data from the optical disc 17.

The optical disc 17 is an optical disc on which a large capacity of data (for example, 27 Gigabytes) having a mark length of 0.14 μm (minimum) and a track pitch of 0.32 μm is recorded with a blue-purple laser having a numerical aperture (NA) of 0.85 and a wavelength of 405 nm. The optical disc 17 may be another type of record medium. For example, the optical disc 17 may be one of various types of optical discs such as DVD-RAM (Digital Versatile Disc-Random Access Memory), DVD-R (DVD-Recordable), DVD-RW (DVD-ReWritable), DVD+R (DVD+Recordable), DVD+RW (DVD+ReWritable), CD-R (Compact Disc-Recordable), CD-RW (CD-ReWritable), or the like.

Video data, audio data, and so forth of MXF data files recorded on the optical disc 17 are managed as one clip by the file system that will be described later with reference to FIG. 5. In the file system, plurality of clips recorded on the optical disc 17 are managed by the index file and the clip information file. The index file is a management file that manages all clips. The clip information file is a management file that manages essence data of each clip.

When the optical disc is loaded into the drive 66, the index file is read from the drive 66 and stored to the RAM 53. When a clip to be reproduced is designated, the clip information file is read from the optical disc 66 and stored to the RAM 53. Hereinafter, video data, audio data, low resolution data, and so forth of MXF data files that compose a clip are referred to as essence data.

When necessary, a drive 67 is also connected to the input/output interface 60. The drive 67 is used when data are read from and written to a removable medium 71 composed of a record medium such as a magnetic disc, an optical disc, an optical-magnetic disc, a semiconductor memory, or the like.

Figure 3:
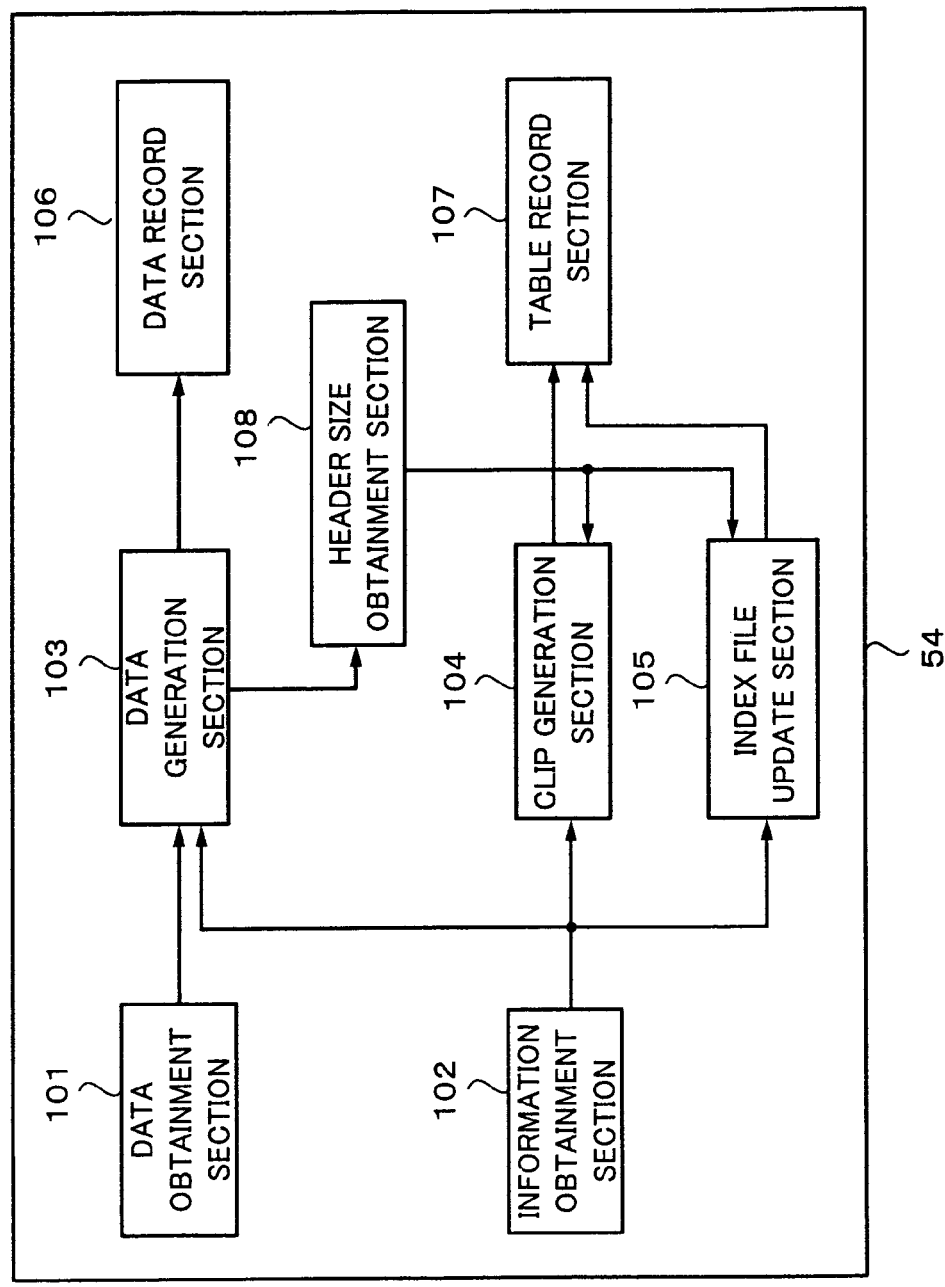
FIG. 3 is a block diagram showing an example of the structure of a record control section shown in FIG. 2.

FIG. 3 shows an example of the structure of the record control section 54 shown in FIG. 2. In the example shown in FIG. 3, the record control section 54 is composed of a data obtainment section 101, an information obtainment section 102, a data generation section 103, a clip generation section 104, an index file update section 105, a data record section 106, table record section 107, and a header size obtainment section 108.

The data obtainment section 101 obtains video data audio data, low resolution data, and so forth from the encoder/decoder section 56 or the storage section 64 and supplies them to the data generation section 103. When the CPU 51 causes the record control section 54 to start recording data the information obtainment section 102 obtains parameter information from the RAM 53 and supplies the parameter information to the data generation section 103, the clip generation section 104, and the index file generation section 105. The parameter information is setup information for the photographing device 14 and used to input (photograph, and record) video data and audio data from the input section 62. The parameter information is reproduction information such as information about resolution of video data and audio data that are input and the type of codec (encoding method). The parameter information has been set up in the photographing device 14 or is set up by the photographing staff member or the like and stored in the RAM 53 through the operation section 61.

The data generation section 103 generates MXF data files composed of a file header, a file body, and a file footer (video data file, audio data file, and low resolution data file) with video data, audio data, low resolution data and so forth supplied from the data obtainment section 101 according to parameter information supplied from the information obtainment section 102 and outputs the essence data to the data record section 106. The data generation section 103 also generates meta data in a predetermined form according to the parameter information and so forth supplied from the information obtainment section 102 and outputs the meta data and so forth to the data record section 106. In addition, the data generation section 103 has stored the header size of each data file in an internal (not shown) memory or the like.

When the parameter information has been input from the information obtainment section 102 to the clip generation section 104, it generates a clip directory to generate a new clip for data that will be input. The clip generation section 104 generates a clip information file that describes attribute information of each type of essence data necessary to reproduce essence data of MXF data files generated by the data generation section 103 and that describes the header size information supplied from the header size obtainment section 108 according to the parameter information supplied from the information obtainment section 102. The clip generation section 104 outputs the generated clip information file to the table record section 107.

The index file update section 105 generates clip elements corresponding to the generated clip according to the parameter information supplied from the information obtainment section 102 and the header size information supplied from the header size obtainment section 108, registers the clip elements to the index file that has been read from the optical disc 17 and stored in the RAM 53, and updates the clip elements. The generated clip elements describe clip attribute information necessary to reproduce the clip and the header size information of each type of essence data. The index file update section 105 outputs the updated index file to the table record section 107.

The data record section 106 records the data generated by the data generation section 103 to the optical disc 17 through the drive 66. The table record section 107 records the clip directory, the clip information file, and so forth generated by the clip generation section 104 and the index file updated by, the index file update section 105 to the optical disc 17 through the drive 66.

The header size obtainment section 108 obtains the header size information from the data generation section 103 and supplies the obtained header size information to the clip generation section 104 and the index file update section 105. The header size obtainment section 108 may obtain header size information from for example the file header of an MXF data file generated by the data generation section 103.

FIG. 4 shows an example of the structure of the reproduction control section 55 shown in FIG. 2. In the example shown in FIG. 4 the reproduction control section 55 is composed of a clip reproduction section 111, a tape reproduction section 112, an index file information obtainment section 113, and a clip information obtainment section 114. The clip reproduction section 111 and the tape reproduction section 112 of the reproduction control section 55 control the index file information obtainment section 113 or the clip information obtainment section 114 according to a clip reproduction start command or a tape reproduction start command issued from the CPU 51 and read data from the optical disc 17.

Although the clip reproduction is the reproduction for one clip, the tape reproduction is a successive clip reproduction process that successively reproduces all clips from the optical disc 17 in the order of which they were recorded as if data were reproduced from a tape.

When the clip reproduction section 111 inputs the clip reproduction start command from the CPU 51, the clip reproduction section 111 controls the index file information obtainment section 113 or the clip information obtainment section 114 to obtain information necessary to reproduce the corresponding clip and the header size information, controls the drive 66 according to the obtained information, reads the file body of an MXF data file (video data, audio data, low resolution data, or the like) from the optical disc 17, and supplies the video data, audio data, low resolution data, or the like to the encoder/decoder section 56. At this point, the clip reproduction section 111 controls the drive 66 to read the file header of the MXF data file according to the header size information.

When the tape reproduction section 112 inputs the tape reproduction start command from the CPU 51, the tape reproduction section 112 controls the index file information obtainment section 113 or the clip information obtainment section 114 to obtain information necessary to reproduce the corresponding clips and the header size information, controls the drive 66 according to the obtained information, reads the file body (video data, audio data, low resolution data, or the like) of the MXF data file from the optical disc 17, and supplies the video data, audio data, low resolution data, or the like to the encoder/decoder section 56. At this point, the tape reproduction section 112 controls the drive 66 to read clips from the optical disc 17 in the order of which they were registered in the index file obtained from the index file information obtainment section 113. In addition, the tape reproduction section 112 controls the drive 66 to read the file body of the MXF data file, not the file header, according to the header size information.

The index file information obtainment section 113 obtains information necessary to reproduce the corresponding clip(s) and the header size information of the essence data of the clip(s) from the index file stored in the RAM 53 under the control the clip reproduction section 111 or the tape reproduction section 112 and outputs the information to the clip reproduction section 111 or the tape reproduction section 112.

The clip information obtainment section 114 reads the corresponding clip information file from the optical disc 17 through the drive 66 under the control of the clip reproduction section 111 or the tape reproduction section 112 and stores the clip information file to the RAM 53. In addition, the clip information obtainment section 114 obtains information necessary to reproduce the corresponding clip(s) and the header size information of the essence data of the clip(s) from the clip information file stored in the RAM 53 and outputs the information to the clip reproduction section 111 or the tape reproduction section 112.

Next, the file system that manages data recorded on the optical disc 17 and the directory structure and files of the file system will be described. In the file system, data recorded on the optical disc 17 are managed in the directory structure and files shown in FIG. 5.

Figure 5:
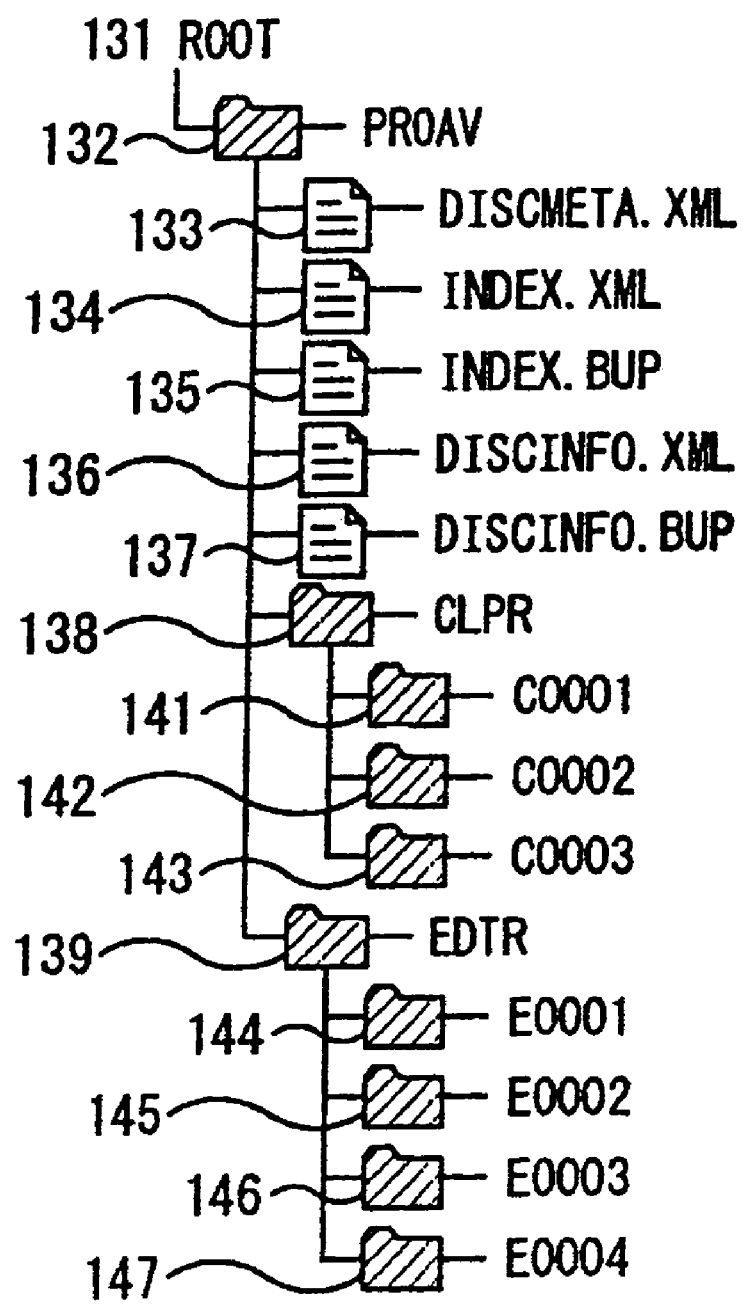
FIG. 5 is a schematic diagram showing an example of the structure of a file system of an optical disc shown in FIG. 1.

FIG. 5 shows an example of the structure of the file system of the optical disc 17. In FIG. 5, under a root directory (ROOT) 131, a PROAV directory 132 is placed. Under the PROAV directory 132, directories for information about essence data of video data, audio data, and so forth, an edit list that represents an edit result of essence data, and so forth are placed. Under the root directory 131, construction table data and so forth (not shown) are placed.

Under the PROAV directory 132, a disc meta file (DISC-META.XML) 133 that is a file that contains titles and comments of all essence data recorded on the optical disc 17 and information such as a path to video data corresponding to a representative picture as a representative frame of all video data recorded on the optical disk 17, an index file (IN-DEX.XML) 134 that contains management information and so forth with which all clips and edit lists recorded on the optical disc 17 are managed, and an index file (INDEX.BUP) 135 are placed The index file 135 is a copy of the index file (INDEX.XML) 134. With the two files, the reliability is improved.

Under the PROAV directory 132, a disc information file (DISCINFO.XML) 136 that is a file that contains meta data of all data recorded on the optical disc 17, for example information such as disc attributes, reproduction start position, Reclnhi, or the like and a disc information file (DISCIN-FO.BUP) 137 are placed. The disc information file 137 is a copy of the disc information file 136. With the two files, the reliability is improved. However, when these information is updated, only the disc information file 136 may be updated.

Besides these files, under the PROAV directory 132, a clip root directory (CLPR) 138 whose lower directory contains data of clips and an edit list root directory (EDTR) 139 whose lower directory contains data of edit lists are placed.

Under the clip directory 138, data of clips recorded on the optical disc 17 are managed with directories corresponding to clips. For example, in FIG. 5, data of three clips are managed with three directories that area clip directory (C0001) 141, a clip directory (C0002) 142, and a clip directory (C0003) 143. In other words, data of the first clip recorded on the optical disc 17 are managed as a file in a lower directory of the clip directory 141. Data of the second clip recorded in the optical disc 17 are managed as a file in a lower directory of the clip directory 142. Data of the third clip recorded on the optical disc 17 are managed as a file in a lower directory of the clip directory 143.

Each clip directory has rewrite and deletion prohibition attribute information. The rewrite and deletion prohibition attribute of data managed as a lower directory of each clip directory is managed according to rewrite and deletion prohibition attribute information of the upper clip directory.

Under the edit list root directory 139, edit lists recorded on the optical disc 17 are managed with directories corresponding to edit processes. In the case shown in FIG. 5, four edit lists are managed with four directories that are an edit list directory (E0001) 144, an edit list directory (E0002) 145, an edit list directory (E0003) 146, and an edit list directory (E0004) 147.

In other words, an edit list that represents the first edit result of a clip recorded on the optical disc 17 is managed as a file in a lower directory of the edit list directory 144. An edit list that represents the second edit result is managed as a file in a lower directory of the edit list directory 145. An edit list that represents the third edit result is managed as a file in a lower directory of the edit list directory 146. An edit list that represents the fourth edit result is managed as a file in a lower directory of the edit list directory 147.

Figure 6:
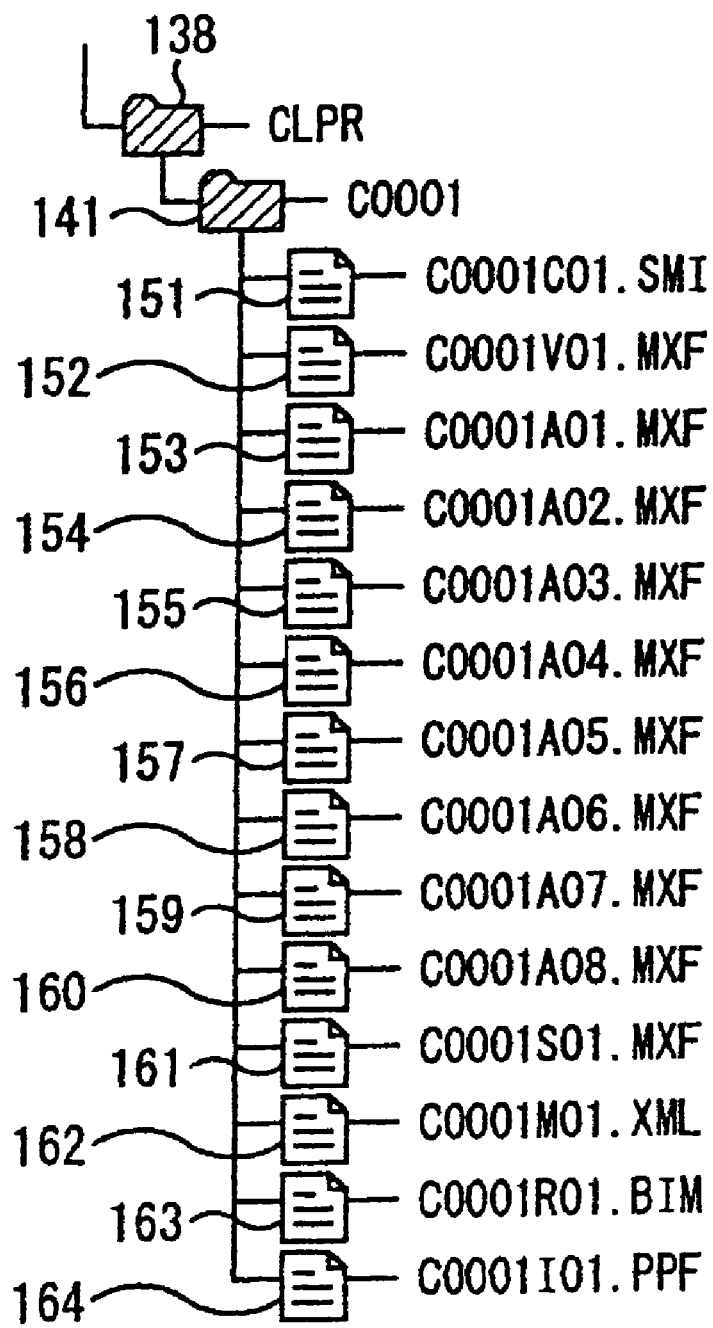
FIG. 6 is a schematic diagram showing an example of the structure of a clip directory shown in FIG. 5.

A lower directory of the clip directory 141 under the clip root directory 138 contains and manages each type of data of the first clip recorded on the optical disc 17 as files shown in FIG. 6.

FIG. 6 shows an example of the structure of the clip directory 141 shown in FIG. 5. In the case shown in FIG. 6, the clip directory 141 contains a clip information file (C0001C01.SMI) 151 that is a file with which the clip is managed, a video data file (C0001V01.MXF) 152 that is a file contains video data of the clip, eight audio data files (C0001A01.MXF to C0001A08.MXF) 153 to 160 that are eight files that contain audio data of individual channels of the clip, a low resolution data file (C0001S01.MXF) 161 that is a file that contains low resolution data corresponding to video data of the clip, a clip meta data file (C0001M01.XML) 162 that is a file that contains clip meta data as meta data that do not need to be in real time corresponding to essence data of the clip, for example, a conversion table between LTC (Linear Time Code) and frame number, a frame meta data file (C0001R01.BIM) 163 that is a file that contains frame meta data that are meta data that need to be in real time corresponding to essence data of the clip, for example, LTC, a picture pointer file (C0001I01.PPF) 164 that is a file that describes the frame structure of the video data file 152 (for example, information about the compression format of each picture in MPEG or the like and information such as an offset address from the beginning of the file), and so forth. As described above, the rewrite and deletion prohibition attributes of these files are managed according to the rewrite and deletion prohibition information of the clip directory 141.

In the example shown in FIG. 6, the video data file 152, the audio data files 153 to 160, and the low resolution data file 161, which compose the clip directory 141, are recorded and managed as MXF data files based on the MXF (Material eXchange Format). As will be described with reference to FIG. 8, an MXF data file is composed of a file header, a file body, and a file footer. In the file body, essence data (video data, audio data, or low resolution data) are placed in the unit of for example 60 (in the NTSC) frames.

In the case shown in FIG. 6, video data, low resolution data, and frame meta data that are data that need to be reproduced in real time are managed as different files so that their read times do not increase.

Likewise, audio data need to be reproduced in real time To deal with audio data of multi channels such as 7.1 channels, eight channels are provided. They are managed as different files. In other words, audio data are managed as eight files. Instead, files for audio data may be seven files or less or nine files or larger.

Likewise, when necessary, video data, low resolution data, and frame metadata may be managed as two or more files each.

In FIG. 6, clip meta data that do not need to be in real time are managed as a file different from frame meta data that need to be in real time. This is because meta data are prevented from being unnecessarily reproduced while video data and so forth are being normally reproduced. Thus, the process time of the reproduction process can be shortened and the load for the process can be lightened.

To allow the clip meta data file 162 to have versatility, the clip meta data file 162 is described in the XML (eXtensible Markup Language) format. However, to shorten the process time for the reproduction process and lighten the load for the process, the frame meta data file 163 is a BIM format file of which an XML format file has been compiled. The frame meta data file 163 that needs to be reproduced in real time has a header portion corresponding to the file header of each essential data file.

The example of the structure of the files in the clip directory 141 shown in FIG. 6 can be applied to all clip directories of clips recorded on the optical disc 17. In other words, the example of the structure of the files shown in FIG. 6 can be applied to the other directories 142 and 143 shown in FIG. 5. Thus, their description will be omitted.

Each file contained in a clip directory for one clip was described. However, the structure of files is not limited to the foregoing example. Instead, any structure may be used as long as a clip meta data file of a clip is contained in a lower director of each clip directory.

Next, an example of the structure of files contained in a lower directory of the edit list root directory 139 shown in FIG. 5 will be described. A lower directory of the edit list directory 145 under the edit list root directory 139 contains and manages data of an edit list that is information about the second edit result of each type of data of a clip recorded on the optical disc 17 as files shown in FIG. 7.

FIG. 7 shows an example of the structure of the edit list directory 145 shown in FIG. 5. In the case shown in FIG. 7, the edit list directory 145 contains an edit list file (E0002E01.SMI) 171 that is a file with which the edit result (edit list) is managed, an edit list clip meta data file (E0002M01.XML) 172 that is a file that contains clip meta data corresponding to essence data of edited data (a portion extracted as edited data from essence data of all clips) or clip meta data newly generated according to the clip meta data, a play list file (E0002P01.SMI) 173 that is a file that contains information such as a reproduction procedure (play list) of essence data according to the edit result (edit list), a play list picture pointer file (E0002I01.PPF) 174 that is a file that describes the frame structure (for example, information about the compression format of each picture of MPEG or the like and information of an offset address from the beginning of the file) of video data reproduced according to the reproduction procedure contained in the play list file 173, a play list video data file (B0002V01.BMX) 175 that is a file that contains video data that assure real time reproduction according to the reproduction procedure (play list) of the play list file 173, four play list audio data files (B0002A01.BMX to B0002A04.BMX) 176 to 179 that are four files that contain audio data that assure real time reproduction according to the reproduction procedure (play list) of the play list file 173, a play list low resolution data file (B0002S01.BMX) 180 that is a file that contains low resolution data that assures real time reproduction according to the reproduction procedure (play list) of the play list file 173, a play list frame meta data file (B0002R01.BRM) 181 that is a file that contains frame meta data that assure real time reproduction according to the reproduction procedure (play list) of the play list file 173, and so forth.

In FIG. 7, clip meta data that do not need to be in real time are managed as a file different from frame meta data that need to be in real time. This is because meta data are prevented from being unnecessarily reproduced while video data and so forth are being reproduced (the edit result is being reproduced) with the reproduction procedure (play list). Thus, the process time of the reproduction process can be shortened and the load for the process can be lightened.

The edit list clip meta data file 172 is a file that contains new clip data generated according to clip meta data (a clip meta data file contained in a lower directory of the clip root directory 138) of a clip used for editing data according to an edit result. Whenever data are edited, the edit list clip meta data file is generated. The edit list clip meta data file 172 is described in the XML format so that the file has versatility.

Video data contained in the play list video data file 175, audio data contained in the play list audio data files 176 to 179, low resolution data contained in the play list low resolution data file 180, and frame meta data contained in the play list frame meta data file 181 are data extracted from video data, audio data, low resolution data, and frame meta data of a clip corresponding to the edit result and managed in a lower directory of the clip root directory 138 shown in FIG. 6. These data are read when a reproduction process is preformed according to a reproduction procedure (play list) contained in the play list file 173. Since data of these edit results are provided, when a reproduction process is performed according to a play list, the number of files to be read can be decreased. Thus, the process time can be shortened and the load for the process can be lightened.

When necessary, video data, low resolution data, and frame meta data may be managed as a plurality of files each. Likewise, the number of files of audio data may be three or less or five or more.

The play list frame meta data file 181 is a BBM format file corresponding to the BIM format of which an XML format file has been compiled so that the process time for the reproduction process is shortened and the load for the process is lightened.

The forgoing example of the structure of the files in the edit list directory 145 shown in FIG. 7 can be applied to all edit lists (edit results). In other words, the example of the structure of the files shown in FIG. 7 can be applied to the other edit list directory 144, 146, or 147 shown in FIG. 5. Thus, the description of these directories will be omitted.

Each file contained in the edit list directory for one edit operation has been described. However, the structure of files is not limited to the foregoing example. Instead, any structure may be applied as long as edit list clip meta data files for an edit operation are contained in a lower directory of each edit list directory.

Figure 8:
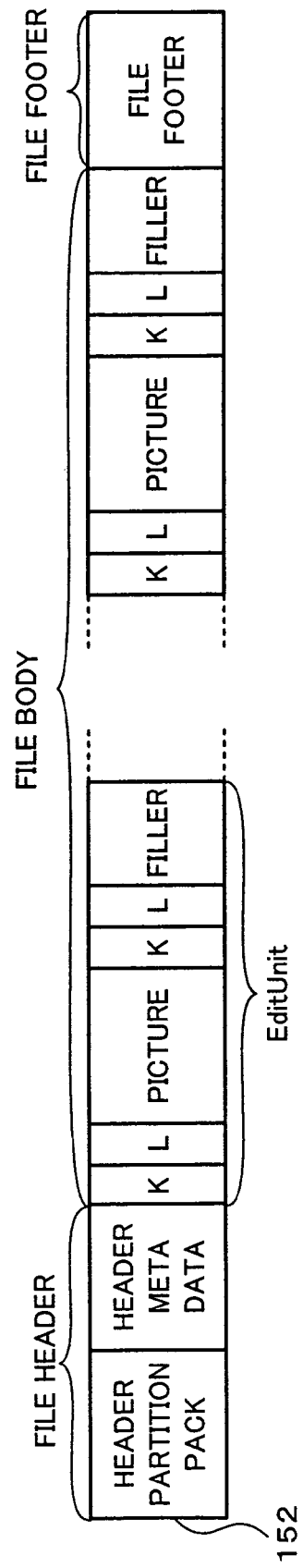
FIG. 8 is a schematic diagram showing an example of the structure of an MXF data file recorded on the optical disc shown in FIG. 1.

FIG. 8 shows an example of the structure of an MXF data file recorded on the optical disc 17. In the example shown in FIG. 8, the MXF data file will be described with the video data file 150 shown in FIG. 6.

The video data file 152 is based on the MXF standard. The video data file 152 is composed of a file header, a file body, and a file footer arranged in the order.

The file header is composed of a header partition pack and a header meta data arranged in the order. The header partition pack contains a pattern of 11 bytes that identifies the header, the format of data contained in the file body, information that represents the MXF file format, header size information, and so forth. The header meta data contains information necessary to read video data, audio data, or low resolution data (in this case, video data), which are essence data contained in the file body.

The file body is also referred to as an essence container. The file body contains video data, audio data, or low resolution data (in this case, video data) in the unit of one edit unit.

One edit unit is a unit of 60 (in the case of NTSC) frames. One edit unit contains video data and so forth for 60 frames. One edit unit contains video data and other data for 60 frames (in the case of NTSC) that have been coded in KLV (Key, Length, Value) structure.

The KLV structure is a structure composed of Key, Length, and Value arranged in the order. Key describes a label of 16 bytes that represents what data are described in Value and that is based on SMPTE 298M standard. Length describes the data length (8 bytes) of data described in Value according to BER (Basic Encoding Rules: ISO/IEC 882-1 ASN). Value describes real data, namely video data (pictures) of 60 (in the case of NTSC) frames. To form video data in a fixed length, a filler as stuffing data is placed after the video data in the KLV structure. In other words, one edit unit is composed of video data (pictures) and a filler arranged in the order in the KLV structure.

The file footer describes data that identify the file footer and so forth.

When a video data file formatted in the foregoing structure is copied from the optical disc 17 to an MXF standard basis device and stored thereto, the MXF standard basis device reads a pattern of 11 bytes from a header partition pack and obtains the file header. Thereafter, the device obtains the position of the file body according to the header partition pack and reads video data as essence data from the file body according to the header meta data. Thus, when the photographing device 14 records video data audio data, or the like as an MXF data file to the optical disc 17, the photographing device 14 can have compatibility with an MXF standard basis device.

The example of, the structure of the MXF data file shown in FIG. 8 can be applied to not only the video data file 152, but all video data files, audio data files, and low resolution data files. In other words, the example of the structure of the audio data files 153 to 160 and the low resolution data file 161 is basically the same as the example of the structure of the files shown in FIG. 8 except for the types of data described in the file body.

Next, the index file of the file system of the optical disc 17 will be described. As described above, the index file is composed of a clip table (clipTable) that describes management information with which all clips recorded on the optical disc 17 are totally managed and an edit list table (editlistTable) that describes management information with which all edit lists recorded on the optical disc 17 are managed. The clip table also contains management information for essence data (video data, audio data, low resolution data, and so forth) of each clip. The edit list table contains meta data of edit lists and management information for play lists and so forth. The index file is a file mainly used on the optical disc 17 to manage data recorded thereon. The index file is managed in the XML format according to a unique schema.

FIG. 9 shows an example of the index file 134 shown in FIG. 5. In FIG. 9, a numeral and a colon sign (:) at the beginning of each line are added for explanation purpose.

Thus, they are not a part of a code. A plus sign (+) followed by an unequal sign (<) represents that the line has a child element. Likewise, the plus sign is not also a part of a code. These rules are applied to codes shown in FIG. 10 to FIG. 15.

<?xml version="1.0" encoding="UTF-8"?>, line 1, represents that the index file 134 starting from line 2 is described in XML format, version "1.0" and encoded according to UTF-8. In the example shown in FIG. 9, between <indexFile xmlns=urn:schemas-professionalDisc:index:2003" xmlns: xsi="http://www.w3.org/2001/XMLSchema-instance" xsi: noNamespaceSchemaLocation="index.xsd">, line 2 to line 4, and </indexFile>, line 7, the index file 134 is described in an XML format defined by schema [schemas-professional-Disc].

<clipTable path="/PROAV/CLPR/">, line 5, represents a clip table with which all clips on the optical disc 17 are managed and that all clips managed with the clip table are recorded under [/PROAV/CLPR/] of the optical disc 17. Child elements contained in the clip table of <clipTable path="/PROAV/CLPR/">, line 5, will be described with reference to FIG. 10.

<editlistTable path="/PROAV/EDTR/">, line 6, represents an edit list table with which all edit lists on the optical disc 17 are managed and that all edit lists managed with the edit list table are recorded under [/PROAV/EDTR/] on the optical disc 17. Child elements contained in the edit list table of <editlistTable path="/PROAV/EDTR/">, line 6, will be described later with reference to FIG. 12.

FIG. 10 shows an example of the clip table of <clipTable path="/PROAV/CLPR/">, line 5, FIG. 9. In the clip table shown in FIG. 10, between <clipTable path="/PROAV/CLPR/"> tag, line 1, and </clipTable> tag, line 18, clips recorded on the optical disc 17 are described as clip elements in the order of which they were recorded.

<clip id="C0001" umid="0123456789ABCDEF0123456789ABCDEF0123456789AA" file="C0001C01.SMI fps="59.94i" dur="12001" ch="4" aspectRatio="4:3">, line 2 to line 5, represents a clip element of the first clip recorded on the optical disc 17.

Firstly, [clip id="C0001" umid="0123456789ABCDEF01234 56789ABCDEF012 3456789AA" file="C0001C01.SMI"], line 2 to line 5, will be described. [clip id="C0001"] represents that the clip ID that is information that uniquely identifies each clip on the optical disc 17 is ["C0001"]. [umid="0123456789 ABCDEF0123456789ABCDEF0123456789AA"] represents a worldwide unique identifier umid (unique material identifier, which will be described later with reference to FIG. 14, assigned to this clip with 22 bytes of 32 bytes excluding a common part of the first 10 bytes. [file="C0001C01.SMI"] represents the file name of the clip information file that describes management information with which the clip recorded on the optical disc 17 is managed.

In other words, (clip id="C0001" umid="0123456789ABCDEF0123456789ABCDEF012 3456789AA" file="C0001C01.SMI"] is information about a conversion table necessary to obtain the clip information file of the clip identified by the clip ID or umid. When the clip ID or umid is designated, the file name of the clip information file of the corresponding clip is obtained with reference to the index file. With reference to the file name and [path="/PROAV/CLPR/], line 1, FIG. 10, the position of the clip information file recorded on the optical disc 17 can be obtained.

10 bytes of Univ Label (Universal Label) represented by the first 12 bytes of umid are a fixed header that represents umid. Umid of the index file is information that is converted into a file name. Unlike umid described in a clip information file or the like, umid of the index file is not often used outside the optical disc 17. Thus, umid of the index file is described without the first 10 bytes. As a result, the capacity of the index file can be decreased.

[fps="59.94i" dur="12001" ch="4" aspectRatio="4:3"], line 2 to line 5, describes attribute information necessary to reproduce the clip. [fps="59.94i"] represents that the resolution in the time base direction is 59.94 field/sec and that the reproduction method for the clip is based on the interlace system. [dur="12001"] represents that the effective length of the clip in the time direction is 1201 frames. [ch="4"] represents that the number of channels of audio data that compose the clip is four channels. [aspectRatio="4:3"] represents that the aspect ratio of video data that compose the clip is "4:3". Among these attribute information, [fps="59.94i" ch="4" aspectRatio="4:3"] is described as setup information that is input for the photographing device 14 with the input section 62 to input (photograph and record) video data and audio data according to their parameter information (information about resolution, type of codec and so forth) stored in the RAM 53.

Since the structure of each of the clip elements of clip ID "C0002" to "C0004" is basically the same as that of the clip element of clip. ID "C0001," their description will be omitted. <clip id="C0002" umid="0123456789ABCDEF01234 56789ABCDEF01 23456789AB" file="C0002C01.SMI" fps="59.94i" dur="4000" ch="4" aspectRatio="4:3">, line 6 to line 9, represents a clip element as the next clip of the clip of clip ID "C0001" recorded on the optical disc 17. This statement represents that the clip ID is ["C0002"], umid is ["0123456789ABCDEF0123456789ABCDEF 0123456789AB"], the file name of the clip information file is ["C0002C01.SMI"], the resolution of the clip in the time base direction is 59.94 field/sec, the reproduction method for the clip is based on the interlace system, the effective length of the clip in the time direction is 4000 frames, the number of channels of audio data that compose the clip is four channel, and the aspect ratio of video data that compose the clip is "4:3."

<clip id="C0003" umid="0123456789ABCDEF 0123456789ABCDEF0123456789AC" file="C0003C01.SMI" fps="59.94i" dur="10000" ch="4" aspectRatio="4:3">, line 10 to line 13, represents a clip element as the next clip of the clip of clip ID "C0002" recorded on the optical disc 17. This statement represents that the clip ID is ["C0003"], umid is ["0123456789ABCDEF 0123456789ABCDEF0123456789AC"], the file name of the clip information file is ["C0003C01.SMI"], the resolution of the clip in the time base direction is 59.94 field/sec, the reproduction method for the clip is based on the interlace system, the effective length of the clip in the time direction is 10000 frames, the number of channels of audio data that compose the clip is four channel, and the aspect ratio of video data that compose the clip is "4:3."

<clip id="C0004" umid="0123456789ABCDEF 0123456789ABCDEF0123456789AD" file="C0004C01.SMI" fps="59.94i" dur="12001" ch="4" aspectRatio="16:9">, line 14 to line 17, represents a clip element as the next clip of the clip of clip ID "C0003" recorded on the optical disc 17. This statement represents that the clip ID is ["C0004"], umid is ["0123456789ABCDEF 0123456789ABCDEF0123456789AD"], the file name of the clip information file is ["C0004C01.SMI"], the resolution of the clip in the time base direction is 59.94 field/sec, the reproduction method for the clip is based on the interlace system, the effective length of the clip in the time direction is 12001 frames, the number of channels of audio data that compose the clip is four channel, and the aspect ratio of video data that compose the clip is "16:9."

As described above, clip elements composed of clip ID, umid, information about file name conversion table for clip information file, and attribute information necessary to reproduce the clip are described in the clip table of the index file in the order of which the clip elements are recorded on the optical disc 17.

FIG. 11 shows an example of a clip element of clip ID ["C0001"] of [<clip id="C0001" umid="0123456789ABCDEF0123456789ABCDEF012 3456789AA" file="C0001C01.SMI" fps="59.94i" dur="12001" ch="4" aspectRatio="4:3">], line 2 to line 5, FIG. 10. In the clip element shown in FIG. 10, between <clip id="C0001" umid="0123456789ABCD EF0123456789ABCDEF 0123456789AA" file="C0001C01.SMI" fps="59.94i" dur="12001" ch="4" aspectRatio="4:3"> tag, line 2 and line 2, and </clip> tag, line 17, essence data that compose the clip are described as clip child elements.

<video umid="0123456789ABCDEF0123456789 ABCDEF0123456789A1" file="C0001V01.MXF" type "DV25_411P" header="65536"/>, line 3 and line 4, represents a clip child element of a video data file that composes the clip.

Firstly, [umid="0123456789ABCDEF0123456789 ABCDEF0123456789A1" file="C0001V01.MXF"], line 3 and line 4, will be described. Like the case shown in FIG. 9, [umid="0123456789ABCDEF0123456789ABCDEF 0123456789A1" is a worldwide unique identifier umid (unique material identifier) assigned to the video data file with 22 bytes of 32 bytes excluding the common part of the first 10 bytes. [file="C0001V01.MXF"] represents the file name of the video data file that composes the clip recorded on the optical disc 17.

In other words, [umid="0123456789ABCDEF 0123456789ABCDEF0123456789A1"] is information about a conversion table necessary to obtain the file name of the clip essence data file (in this case, a video data file) of the clip identified by umid. When umid is designated, the file name of the corresponding video data file is obtained with reference to the index file. With reference to the file name and [path="/PROAV/CLPR/], line 2, FIG. 9, the position of the video data file recorded on the optical disc 17 can be obtained.

[type="DV25_411P"], line 3 and line 4, describes attribute information of the video data file necessary to reproduce the MXF data file (in this case, the video data file). [type="DV25_411P"] represents that the type of codec of the video data file is ("DV25_411P"]. Like the attribute information of the clip element shown in FIG. 9; the attribute information [type="DV25_411P"] is described as setup information that is input for the photographing device 14 with the input section 62 to input (photograph and record) video data and audio data according to their parameter information (information about resolution, type of codec, and so forth) stored in the RAM 53.

[header="65536"], line 3 and line 4, describes header size information stored in the data generation section 103 and obtained by the header size obtainment section 108 when the video data file is generated.

Since the structure of each of clip child elements of an audio data file, a low resolution data file, a clip meta data file, and a frame meta data file that compose a clip is basically the same as the structure of a clip child element of a video data file, their description will be omitted. <audio umid="0123456789ABCDEF0123456789ABCDEF01

23456789A2" file="C0001A01.MXF" type "LPCM16" header="65536" cast="CH1"/>, line 5 and line 6, represents a clip child element of an audio data file that composes the clip. This statement represents that umid is [umid="0123456789ABCDEF 0123456789ABCDEF0123456789A2"], that the file name of the audio data file is "C0001A01.MXF", that the type of codec of the audio data file is ["LPCM16"], that the header size of the audio data file is ["65536" bytes], and that this audio data file is reproduced as channel 1 ("CH1"). When a child element is an audio data file, the child element describes ["cast="CH1"] as channel information of which the audio data file is reproduced.

<audio umid="0123456789ABCDEF0123456789 ABCDEF0123456789A3" file="C0001A02.MXF" type "LPCM16" header="65536" cast="CH2"/>, line 7 and line 8, represents a clip child element of an audio data file that composes the clip. This statement represents that umid is [umid="0123456789ABCDEF0123456789ABCDEF 0123456789A3"], that the file name of the audio data file is "C0001A02.MXF", that the type of codec of the audio data file is ["LPCM16"], that the header size of the audio data file is ["65536" bytes], and that this audio data file is reproduced as channel 2 ("CH2").

<audio umid="0123456789ABCDEF0123456789 ABCDEF0123456789A4" file="C0001A03.MXF" type "LPCM16" header="65536" cast="CH3"/>, line 9 and line 10, represents a clip child element of an audio data file that composes the clip. This statement represents that umid is [umid="0123456789ABCDEF0123456789ABCDEF 0123456789A4"], that the file name of the audio data file is "C0001A03.MXF", that the type of codec of the audio data file is ["LPCM16"], that the header size of the audio data file is ["65536" bytes], and that this audio data file is reproduced as channel 3 ("CH3").

<audio umid="0123456789ABCDEF0123456789 ABCDEF0123456789A5" file="C0001A04.MXF" type "LPCM16" header="65536" cast="CH4"/>, line 11 and line 12, represents a clip child element of an audio data file that composes the clip. This statement represents that umid is [umid="0123456789ABCDEF0123456789ABCDEF 0123456789A5"], that the file name of the audio data file is "C0001A04.MXF", that the type of codec of the audio data file is ["LPCM16"], that the header size of the audio data file is ["65536" bytes], and that this audio data file is reproduced as channel 4 ("CH4").

<subStream umid="0123456789ABCDEF0123456789 ABCDEF0123456789A6" file="C0001S01.MXF" type "PD-SubStream" header="65536"/>, line 13 and line 14, represents a clip child element of a low resolution data file that composes the clip. This statement represents that umid is [umid="0123456789ABCDEF 0123456789ABCDEF0123456789A6"], that the file name of the low resolution data file is "C0001S01.MXF", that the type of codec of the low resolution data file is ["PD-SubStream"], and that the header size of the low resolution data file is ["65536" bytes].

<meta file="C0001M01.XML" type="PD-Meta"/>, line 15, represents a clip child element of a clip meta data file that composes the clip. This statement represents that the file name of the clip meta data file is ["C0001M01.XML"] and that the type of codec is ["PD-Meta"].

<rtmeta file="C0001R01.BIM" type="std" header="65536"/>, line 16, represents a clip child element of a frame meta data file that composes the clip. This statement represents that the file name of the frame meta data file is ["C0001R01.BIM"] and that the type of codec is ["std"]. In addition, a frame meta data file contains a header portion corresponding to the file header of each essence data file.

[header="65536"] represents that the header size of the frame meta data file is ["65536" bytes].

In this case, although umid is not designated to the clip meta data file and the frame meta data file, umid may be designated thereto.

As described above, the clip table of the index file describes umid of the essence data (MXF data file) that composes the clip, information about the file name conversion table of the MXF data file, attribute information (type of codec and resolution) necessary to reproduce the essence data that compos the clip, and the header size information with which the essence data are directly read.

Thus, when only the index file is read, information necessary to reproduce the clip and the header size are obtained: Thus, according to the obtained file name, the file body of the MXF data file that composes the clip can be directly read from the optical disc 17. In other words, since the essence data of the file body can be read without need to read the file header of the MXF data file, the process time that takes after the reproduction is designated until the reproduction is preformed is shortened.

In the clip element shown in FIG. 11, it was assumed that the header size information that describes the header size of all clip child elements is [header="65536"]. Instead, the clip child elements may have different header sizes.

The example of the structure of the clip element of clip ID ["C0001"] shown in FIG. 11 can be applied to clip elements of all clip IDs of clips recorded on the optical disc 17. In other words, since the example of the structure of the clip element shown in FIG. 11 can be applied to other clip elements of clip IDs ["C0002"] to ["C0004"] shown in FIG. 10, their description will be omitted.

FIG. 12 shows an example of the edit list table of [<editlistTable path="/PROAV/EDTR/">], line 6, FIG. 8. In the edit list table shown in FIG. 12, between <editlistTable path="/PROAV/EDTR/"> tag, line 1, and </editlistTable> tag, line 18, edit lists as edit results of clips recorded on the optical disc 17 are described as edit list elements in the order of which they were edited. Since the structure of the edit lists shown in FIG. 12 is basically the same as the structure of clips as elements described in the table exemplified in FIG. 10, the detail description will be omitted.

<editlist id="E0001" umid="0123456789 ABCDEF0123456789ABCDEF0123456789BB" file="E0001E01.SMI" dur="500" fps="59.941" ch="4" aspectRatio="4:3">, line 2 to line 5, FIG. 12, represents the first edit list element as an edit result of a clip recorded on the optical disc 17. This statement represents that the edit ID is ["E0001⇋"], that umid is ["0123456789ABC-DEF0123456789 ABCDEF0123456789BB"], and that the file name of the edit list file is ["E0001E01.SMI"]. In addition, this statement represents that as attribute information of the edit list, the effective length of the edit list in the time direction is 500 frames, the resolution of the edit list in the time base direction is 59.94 field/sec, the reproduction method of the edit list is based on the interlace system, and the number of channels of the audio data reproduced according to the edit list is four channels, and the aspect ratio of video data reproduced according to the edit list is [4:3].

<editlist id="E0001" umid="0123456789 ABCDEF0123456789ABCDEF0123456789BC" file="E0002E01.SMI" dur="500" fps="59.94i" ch="4" aspectRatio="4:3">, line 6 to line 9, represents an edit list element as an edit result of a clip after the edit list of edit list ID ["E0001"]. This statement represents that the edit ID is ["E0002"], that umid is ["0123456789ABCDEF0123456789ABCDEF0123456 789BC"], and that the file name of the edit list file is ["E0002E01.SMI"]. In addition, this statement represents that as attribute information of the edit list, the effective length of the edit list in the time direction is 500 frames, the resolution of the edit list in the time base direction is 59.94 field/sec, the reproduction method of the edit list is based on the interlace system, and the number of channels of the audio data reproduced according to the edit list is four channels, and the aspect ratio of video data reproduced according to the edit list is [4:3].

<editlist id="E0003" umid="0123456789 ABCDEF0123456789ABCDEF0123456789BD" file="E0003E01.SMI" dur="500" fps="59.94i" ch="4" aspectRatio="4:3">, line 10 to line 13, represents an edit list element as an edit result of a clip after the edit list of edit list ID ["E0002"]. This statement represents that the edit ID is ["E0003"], that umid is ["0123456789ABCDEF0123456789ABCDEF0123456 789BD"], and that the file name of the edit list file is ["E0003E01.SMI"]. In addition, this statement represents that as attribute information of the edit list, the effective length of the edit list in the time direction is 500 frames, the resolution of the edit list in the time base direction is 59.94 field/sec, the reproduction method of the edit list is based on the interlace system, and the number of channels of the audio data reproduced according to the edit list is four channels, and the aspect ratio of video data reproduced according to the edit list is [4:3].

<editlist id="E0004" umid="0123456789 ABCDEF0123456789ABCDEF0123456789BE" file="E0003E01.SMI" dur="500" fps="59.94i" ch="4" aspectRatio="16:9">, line 14 to line 17, represents an edit list element as an edit result of a clip after the edit list of edit list ID ["E0003"]. This statement represents that the edit ID is ["E0004"], that umid is ["0123456789ABCDEF0123456789ABCDEF 0123456789BE"], and that the file name of the edit list file is ["E0004E01.SMI"]. In addition, this statement represents that as attribute information of the edit list, the effective length of the edit list in the time direction is 500 frames, the resolution of the edit list in the time base direction is 59.94 field/sec, the reproduction method of the edit list is based on the interlace system, and the number of channels of the audio data reproduced according to the edit list is four channels, and the aspect ratio of video data reproduced according to the edit list is [4:3].

FIG. 13 shows an example of the structure of an edit list element of edit list ID "E0001" of [<editlist id="E0001" umid="0123456789ABCDEF 0123456789ABCDEF0123456789BB" file="E0001E01.SMI" dur="500" fps="59.94i" ch="4" aspectRatio="4:3">], line 2, FIG. 12. In the edit list element shown in FIG. 13, between <editlist id="E0001" umid="0123456789 ABCDEF0123456789ABCDEF0123456789BB" file="E0001E01.SMI" dur="500" fps="59.94i" ch="4" aspectRatio="4:3"> tag, line 1 to line 4, and </editlist> tag, line 7, data that compose the edit list are described as an edit list child element.

<playlist file="E0001P01:SMI"/>, line 5, represents an edit list child element of the play list file that is information about the reproduction order (play list) of essence data according to the edit list (edit result). This statement represents that the file name of the play list file is ["E0001P01.SMI"].

<meta file="E0001M01.XML" type="PD-Meta"/>, line 6, represents an edit list child element of the clip meta data file of the edit list. This statement represents that the file name of the clip meta data-file of the edit list is ["E0001M01.XML"] and that the type of codec of the clip meta data file of the edit list is ["PD-Meta"]. In this case, although umid is not designated to the play list file and the meta data file, umid may be designated thereto.

As described above, edit list elements composed of edit list ID, umid, information about file name conversion table for edit list file, and attribute information necessary to reproduce the edit list are described in the edit list table of the index file in the order of which the edit list elements are edited.

The example of the structure of the edit list element of edit list ID ["E0001"] shown in FIG. 13 can be applied to edit list elements of edit list IDs of edit lists recorded on the optical disc 17. In other words since the example of the structure of the edit list element shown in FIG. 13 can be applied to other edit list elements of edit list IDs ["E0002"] to ["E0004"] shown in FIG. 11, their description will be omitted.

Next, the clip information file of the file system of the optical disc 17 will be described. As described above, the clip information file contains management information with which each clip recorded on the optical disc 17 is managed. To allow the clip information file to have versatility, the clip information file is described in SMIL (Synchronized Multimedia Integration Language) in the XML format.

FIG. 14 and FIG. 15 show an example of a code from <body> tag, which is a start tag to </body> tag, which is an end tag, of the clip information file 151 shown in FIG. 7. FIG. 14 shows line 1 to line 20 of the code. FIG. 15 shows line 21 to line 42 of the code. Besides the code from <body> tag to </body> tag of the clip information file 151 shown in FIG. 14 and FIG. 15, the clip information file 151 contains information that represents that the clip information file 151 is described in SMIL, header information that contains information about the clip meta data of the clip (for example, the clip meta data file 162 shown in FIG. 7), and so forth (not shown in FIG. 13 and FIG. 14).

<par> tag, line 2, and </par> tag, line 41, represent that essence data described therebetween are reproduced in parallel. <switch> tag, line 3, and </switch> tag, line 38, represent that one type of essence data described therebetween is selected and reproduced. [<!- - - main stream - - - >], line 4, is a commend tag that represents that essence data described between <par systemComponent="IMX50" tag, line 5, to </par> tag, line 33, are main line data (original video data and audio data).

[systemComponent="IMX50"] of <par systemComponent="IMX50"> tag, line 5, represents the type of codec of video data that the photographing device 14 can reproduce (or needs to reproduce). Thus, <par systemComponent="IMX50">, line 5, represents that essence data described from this tag to </par> tag, line 33, are simultaneously reproduced when the type of codec of video data of the essence data described between these tags is [IMX50].

<video src="urn:smpte:umid: 060A2B3401010 10501010D1213000000123456789ABCDEF0123456 789ABCDEF" type "IMX50" header="65536"> describes attribute information of video data to be reproduced. ["src="urn:smpte:umid: 060A2B340101010501010D12 13000000 0123456789ABCDEF0123456789ABCDEF"] represents that video data (for example, the Video data file 152) of ["umid: 060A2B34 0101010501010D1213000000 0123456789ABCDEF0123456789ABCDEF"] defined in SMPTE (Society of Motion Picture and Television Engineers) are to be reproduced. [type="IMX50"] represents the codec type as additional information necessary to reproduce video data. Like the header size information shown in FIG. 11, [header="65536"] represents that the header size of the file header of the video data file is ["65536" bytes] and that the file body of the video data file starts from the position at which the file is sought from the beginning for the header size (namely, the offset value from the beginning of the file to the beginning of the file body). Thus, this statement, line 6 to line 8, represents that the video data file 152 is reproduced according to [IMX50].

umid (unique material identifier) is a worldwide unique identifier (ID) assigned to data to be referenced. umid (UMID) is categorized as basic UMID (32 bytes) and extended UMID (32 bytes). Basic UMID (32 bytes) is a unique ID for video data, audio data, and so forth. Extended UMID represents a source pack (time, place, photographer, and so forth). Extended UMID is added to basic UMID to represent the characteristic of pictures and to retrieve data this manner, in the clip information file, essence data are managed with umid. Thus, on the optical disc 17, it is necessary to convert umid into a file name with the index file. However, since umid has versatility, it can be used by other devices.

<audio src="urn:smpte:umid: 060A2B3401010 10501010D1213000000000123456789ABCDEF01234567 89ABCDEF0" type "LPCM16" header="65536" trackDst="CH1"/> describes attribute information of audio data to be reproduced. [type="LPCM16"] represents that audio data are reproduced according to LPCM16. [header="65536"] represents that the header size of the audio data file is ["65536" bytes]. [trackDst="CH1"] represents that this audio data are reproduced as channel 1. Thus, this statement, line 10 to line 12, represents that audio data of [umid: 060A2B340101010 501010D1213000000012345 6789ABCDEF 0123456789 ABCDEF0] (for example, the audio data file 153) are reproduced as channel 1 from the position of ["65536" bytes] apart from the beginning of the file according to LPCM16.

Likewise, <audio src="urn:smpte:umid: 060A2B340101010501010D12130000000123456789A BCDEF0123456 789ABCDEF01" type "LPCM16" header="65536" trackDst="CH2"/>, line 12 to line 14, represents audio data (for example, the audio data file 154) of [umid: 060A2B 340101010501010D1213000000012 3456789ABCDEF 0123456789ABCDEF01] are reproduced from the position of ["65536" bytes] apart from the beginning of the file *as channel 2 according to LPCM16. <audio src="urn:smpte:umid: 060A2B340101010501010D 12130000000 123456789ABCDEF0123456789AB CDEF012" type "LPCM16" header="65536" trackDst="CH3"/>, line 15 to line 17, represents audio data (for example, the audio data file 155) of [umid: 060A2B340101010501010D1213000000 0123456789ABCDEF0123456789ABCDEF012] are reproduced as channel 3 from the position of ["65536" bytes] apart from the beginning of the file according to LPCM16. <audio src="urn:smpte:umid: 060A2B340101010501010 0D12130000000123456789ABCDEF0123456789ABCD EF0123" type "LPCM16" header="65536" trackDst="CH4"/>, line 18 to line 20, represents audio data (for example, the audio data file 156) of [umid: 060A2B340101010501010 D12130000000123456789ABCDEF0123456789ABCD EF0123] are reproduced as channel 4 from the position of ["65536" bytes] apart from the beginning of the file according to LPCM16.

In addition, <audio src="urn:smpte:umid: 060A2B340101010501010D12130000000123456789A BCDEF0123456 789ABCDEF01234" type "LPCM16" header="65536" trackDst="CH5"/>, line 21 to line 23, represents audio data (for example, the audio data file 157) of [umid: 060A2B340101010501010D12130000000123456789 ABCDEF0123456789ABCDEF01234] are reproduced as channel 5 from the position of ["65536" bytes] apart from the beginning of the file according to LPCM16. <audio src="urn: smpte:umid: 060A2B340101010501010D1213000000 0123456789ABCDEF0123456789ABCDEF012345" type "LPCM16" header="65536" trackDst="CH6"/>, line 24 to line 26, represents audio data (for example, the audio data file 158) of [umid: 060A2B340101010501010D1213000000 0123456789ABCDEF0123456789ABCDEF012345] are reproduced as channel 6 from the position of ["65536" bytes] apart from the beginning of the file according to LPCM16.

In addition, <audio src="urn:smpte:umid: 060A2B340101010501010D12130000000123456789A BCDEF0123456 789ABCDEF0123456" type "LPCM16" header="65536" trackDst="CH7"/>, line 27 to line 29, represents audio data (for example, the audio data file 159) of [umid: 060A2B340101010501010D12130000000123456789 ABCDEF0123456789ABCDEF0123456] are reproduced as channel 7 from the position of ["65536" bytes] apart from the beginning of the file according to LPCM16. <audio src="urn: smpte:umid: 060A2B34010101050 1010D12130000000123456789ABCDEF0123456789A BCDEF01234567" type "LPCM16" header="65536" trackDst="CH8"/>, line 30 to line 32, represents audio data (for example, the audio data file 160) of [umid: 060A2B340101010501010 D12130000000123456789ABCDEF0123456789ABC DEF01234567] are reproduced as channel 8 from the position of ["65536" bytes] apart from the beginning of the file according to LPCM16.

[<!- - - sub stream - - - >], line 34, is a comment tag that represents that essence data described from line 35 to line 37 are low resolution data.

<ref src="urn:smpte:umid: 060A2B340 101010501010D12130000000123456789ABCDEF0123 45678" type="SubStream" header="65536" systemComponent="SubStream"/>, line 35 to line 37, describes attribute information of any data (in this case, low resolution data) to be reproduced. [type="SubStream"] represents that low resolution data are reproduced according to codec SubStream. [systemComponent="SubSystem"] represents the type of codec of low resolution data that the photographing device 14 can reproduce (or needs to reproduce). Thus, the statement, line 35 to line 37, represents that low resolution data (for example, the low resolution data file 161) of [urn:smpte:umid: 060A2B340101010501010D1213000000 0123456789ABCDEF012345678] are reproduced from the position of ["65536" bytes] apart from the beginning of the file according to codec SubStream.

[<!- - - realtime meta - - - >], line 39, is a commend tag that represents that essence data described in line 41 is real time data.

<metastream src="C0001R01.BIM" type="std" header="65536"/>, line 40, describes attribute information of meta data to be reproduced. [src=C0001R01.BIM"] represents the file name of frame meta data [type="std"] represents that the frame data are reproduced according to codec [std]. Thus, the statement, line 35 to line 37, represents that frame meta data (for example, the frame meta data file 163) of file name ["C0001R01.BIM"] are reproduced from the position of ["65536" bytes] apart from the beginning of the file according to [std].

Thus, the clip information file 151 shown in FIG. 14 and FIG. 15 represents that the video data file 152 and the audio data files 153 to 160 or the low resolution data file 161 is selected and reproduced from the position of ["65536" bytes] apart from the beginning of the file along with the frame meta data file 163.

As described above, the clip information file contains additional information of essence data necessary to reproduce the essence data that compose a clip and the header size information of the MXF data file of the essence data. Thus, when the clip information file is referenced, additional information of essence data can be readily obtained as information necessary to reproduce the essence data without need to read the MXF data file and interpret information necessary to reproduce the essence data In addition, essence data contained in the file body can be reproduced after the file header of the MXF data file.

In the clip information file, versatile SMIL is used In addition, essence data that compose a clip is managed with versatile umid. Thus, the clip information file can be readily used by other devices.

In the clip information file shown in FIG. 14 and FIG. 15, it was assumed that the header size information of all MXF data files that describe the header size is [header="65536"]. However, the MXF data files may have different header sizes.

Figure 16:
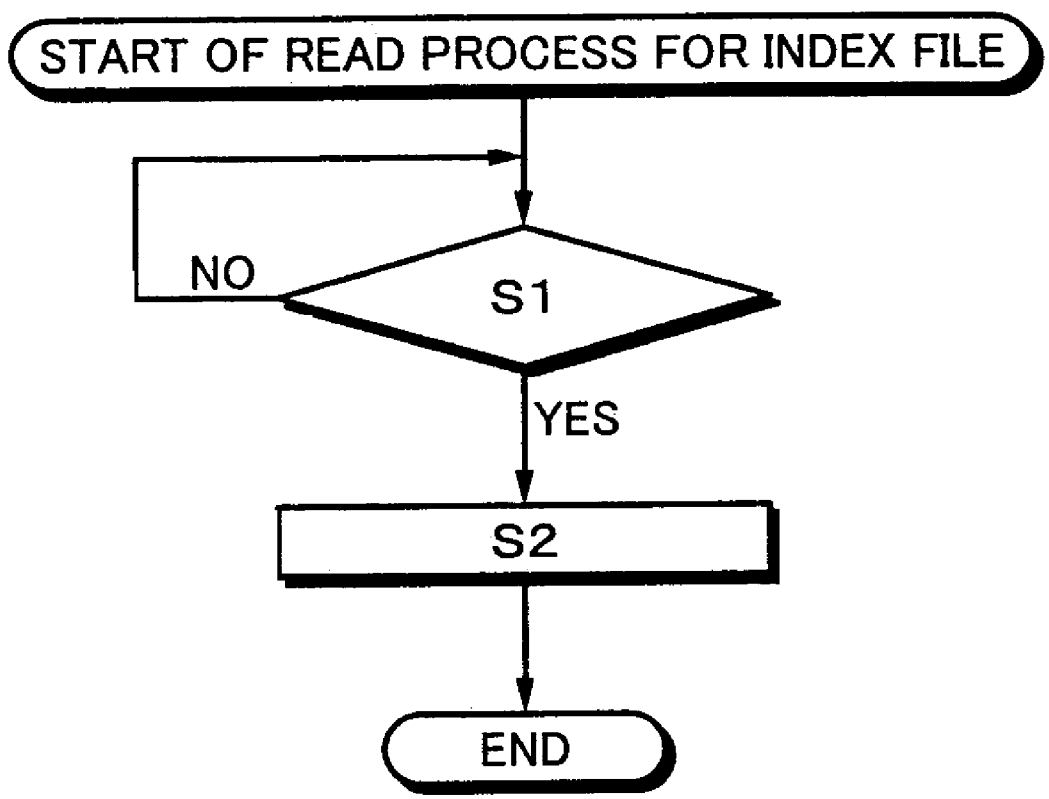
FIG. 16 is a flow chart describing a read process for an index file of the photographing device shown in FIG. 1.

Next, with reference to a flow chart shown in FIG. 16, a read process for the index file will be described. The read process for the index file is executed when the optical disc 17 is loaded into the photographing device 14.

The photographing staff member loads the optical disc 17 into the drive 66 to record video data and audio data that are photographed by the photographing device 14 or to reproduce video data and audio data from the optical disc 17.

At step S1, the CPU 51 waits until the optical disc 17 has been loaded into the drive 66. When the CPU 51 has determined that the optical disc 17 had been loaded into the drive 66, the flow advances to step S2. At step S2, the CPU 51 controls the drive 66 to read the index file (for example, the index file 134) from the optical disc 17, stores (loads) the index file to the RAM 53, and completes the read process for the index file.

Thus, when the optical disc 17 is loaded into the drive 66 of the photographing device 14, the index file is read from the optical disc 17 and stored to the RAM 53. Thereafter, the data write process and data read process for the optical disc 17 are executed according to the index file stored in the RAM 53. Thus, data recorded on the optical disc 17 can be quickly accessed.

Next, with reference to a flow chart shown in FIG. 17, a clip generation process of the photographing device 14 will be described. In this case, it is assumed that the optical disc 17 has been loaded into the photographing device 14, the read process for the index file described with reference to FIG. 16 has been executed, and the index file (for example, the index file 134) has been stored in the RAM 53. This assumption will be applied to processes shown in FIG. 18, FIG. 19, and FIG. 21.

The photographing staff member operates a record button that composes the operation section 61 and causes the photographing device 14 to record video data and audio data that it photographs to the optical disc 17. The operation section 61 outputs a data record command signal to the CPU 51. When the data record command signal has been input from the operation section 61, the CPU 51 causes the input section 62, the encoder/decoder section 56, the record control section 54 and the optical disc 17 to start recording data to the optical disc 17. At this point, parameter information (information about resolution, type of codec, and so forth) of video data and audio data has been set by the photographing staff member through the operation section 61 and stored in the RAM 53 (or the parameter information that had been preset in the photographing device 14 may have been stored in the RAM 53).

The input section 62 inputs video data photographed by the camera and audio data collected by the microphone according to a command issued from the CPU 51 and supplies the video data and audio data to the encoder/decoder section 56. The encoder/decoder section 56 encodes the video data and audio data supplied from the input section 62 according to the parameter information stored in the RAM 53 and supplies the encoded video data, audio data, and low resolution data to the data obtainment section 101.

The information obtainment section 102 of the record control section 54 waits until the record start command has been issued from the CPU 51 at step S21 shown in FIG. 17. When the information obtainment section 102 has determined that the data record start command had been issued from the CPU 51, the flow advances to step S22. At step S22, the information obtainment section 102 obtains the parameter information stored in the RAM 53 and supplies the parameter information to the data generation section 103, the clip generation section 104, and the index file update section 105. At this point, the data obtainment section 101 supplies the video data audio data, and low resolution data supplied from the encoder/decoder section 56 to the data generation section 103.

When the clip generation section 104 has input the parameter information from the information obtainment section 102, the flow advances to step S23. At step S23, the clip generation section 104 generates the clip directory (for example, the clip directory 141) with which video data, audio data, and low resolution data inputted to the photographing device 14 are managed as clips and outputs the generated clip directory to the table record section 107. Thereafter, the flow advances to step S24. At step S24, the table record section 107 records the clip directory supplied from the clip generation section 104 to the optical disc 17 through the drive 66.

At step S24, the data generation section 103 generates the header and footer of essence data supplied from the data obtainment section 101 according to the parameter information supplied from the information obtainment section 102, generates MXF essence data files (for example, the video data file 152, the audio data files 153 to 160, and the low resolution data file 161) composed of the generated header, footer, and body and outputs the generated essence data files to the data record section 106. Thereafter, the flow advances to step S25. At this point, the data generation section 103 stores the header size information of each file header of the generated MXF files to the internal memory or the like. At step S25, the data record section 106 records the essence data files supplied from the data generation section 103 to the optical disc 17 through the drive 66.

At step S25, the data generation section 103 generates a frame meta data data file (for example, the frame meta data data file 163) according to the parameter information supplied from the information obtainment section 102 and the video data and audio data supplied from the data obtainment section 101 and outputs the generated frame meta data data file to the data record section 106. Thereafter, the flow advances to step S26. At this point, the data generation section 103 also stores the header size information of each file header of the generated MXF files to the internal memory or the like.

At step S26, the data record section 106 records the frame meta data data file supplied from the data generation section 103 to the optical disc 17 through the drive 66.

At step S26, the data generation section 103 generates a clip meta data data file (for example, the clip meta data data file 162) according to the parameter information supplied from the information obtainment section 102 and the video data and audio data supplied from the data obtainment section 101 and outputs the generated clip meta data data file to the data record section 106. Thereafter, the flow advances to step S27. At step S27, the data record section 106 records the clip meta data data file supplied from the data generation section 103 to the optical disc 17 through the drive 66.

At step S27, the data generation section 103 generates a picture pointer file (for example, the picture pointer file 164) according to the parameter information supplied from the information obtainment section 102 and the video data and audio data supplied from the data obtainment section 101 and outputs the generated picture pointer file to the data record section 106. Thereafter, the flow advances to step S28. At step S28, the data record section 106 records the picture pointer file supplied from the data generation section 103 to the optical disc 17 through the drive 66.

At step S28, the header size obtainment section 108 obtains the header size information of the MXF data file of each essence data from the data generation section 103 and supplies the obtained header size information to the clip generation section 104 and the index file update section 105. Thereafter, the flow advances to step S29.

At step S29, the clip generation section 104 generates a clip information file (for example, the clip information file 151) according to the parameter information supplied from the information obtainment section 102 and the header size information supplied from the header size obtainment section 108. Specifically, the clip generation section 104 generates a clip information file that contains attribute information (for example, [umid: 060A2B3401010 10501010D1213000000012345678ABCDEF0123456 789ABCDEF], line 7, FIG. 14, and so forth) that is described according to each type of essence data generated by the clip generation section 104 and with which each type of essence data is managed, attribute information (for example, [type="IMX50"], line 8, FIG. 14, and [type="LPCM16" trackDst="CH1"], line 11, and so forth) that is described according to the parameter information supplied from the information obtainment section 102 and that is necessary to reproduce the essence data, and the header size information of the MXF data file of each type of essence data, and outputs the generated clip information file to the table record section 107. Thereafter, the flow advances to step S30. At step S30, the table record section 107 records the clip information file supplied from the clip generation section 104 to the optical disc 17 through the drive 66.

At step S30, the index file update section 105 executes an update process for the index file to add a new clip element to the clip table of the index file. Next, with reference to a flow chart shown in FIG. 18, the update process for the index file will be described.

At step S41 shown in FIG. 18, the index file update section 105 generates a clip element that describes management information such as umid of a clip and a file name (for example, [clip id="C0001"], [umid="0123456789ABCDEF0123456789ABCDEF 0123456789AA"], [file="C0001C01.SMI"], [dur="12001"], and so forth), line 2 to line 5, FIG. 10), with which a clip is managed, according to the clip information file generated by the clip generation section 104. Thereafter, the flow advances to step S42. At step S42, the index file update section 105 describes attribute information (for example, [fps="59.94i"], [ch="4"], [aspectRatio="4:3"], and so forth, line 2 to line 5, FIG. 10) that is necessary to reproduce a clip to the clip element generated according to the parameter information supplied from the information obtainment section 102. Thereafter, the flow advances to step S43. Since [dur=] is generated according to the generated clip information file, for convenience of description, [dur=] is contained in management information with which a clip is managed. Instead, [dur=] may be contained in attribute information that is necessary to reproduce a clip.

At step S43, the index file update section 105 generates a clip child element that describes management information such as umid of essence data contained in a clip and a file name (for example, [umid="0123456789ABCDEF0123456789ABCDEF012 3456789A1"] and [file="C0001V01.MXF"], line 3 and line 4, FIG. 11) with which a clip is managed in a clip element according to the clip information file. Thereafter, the flow advances to step S44. At step S44, the index file update section 105 describes attribute information (for example, [type="DV25_411P"], line 4, FIG. 11) that is necessary to reproduce each type of essence data in the generated clip child element according to the parameter information supplied from the information obtainment section 102. Thereafter, the flow advances to step S45. At step S45, the index file update section 105 describes the header size information (for example, [header="65536", line 4, FIG. 11) of the MXF data file of each type of essence data to the generated clip child element according to the header size information supplied from the header size obtainment section 108. Thereafter, the flow advances to step S46.

At step S46, the index file update section 105 adds (registers) the generated clip element (containing the clip child element) to the clip table of the index file stored in the RAM 53, updates the index file (for example, the index file 134), and outputs the updated index file to the table record section 107. At this point, the index file update section 105 registers the generated clip element to the last clip element registered in the clip table. The table record section 107 records the index file supplied from the index file update section optical disc 17 through the drive 66, returns to FIG. 17, and completes the clip generation process.

As described above, attribute information necessary to reproduce essence data is described in the index file and the clip information file. Thus, when data are reproduced from the optical disc 17, since attribute information necessary to reproduce essence data can be obtained according to the index file or the clip information file, attribute information does not need to be read from essence data. As a result, the process time for the reproduction is shortened.

In addition, since the header size information of an MXF data file of an essence data file is described in the index file and the clip information file, when essence data of an MXF data file is read from the optical disc 17, the essence data can be directly read from the position of which the header size is removed from the beginning of the MXF data file (namely, the file body) according to the index file or the clip information file. Thus, data can be more effectively reproduced than the case that only attribute information is described.

Figure 19:
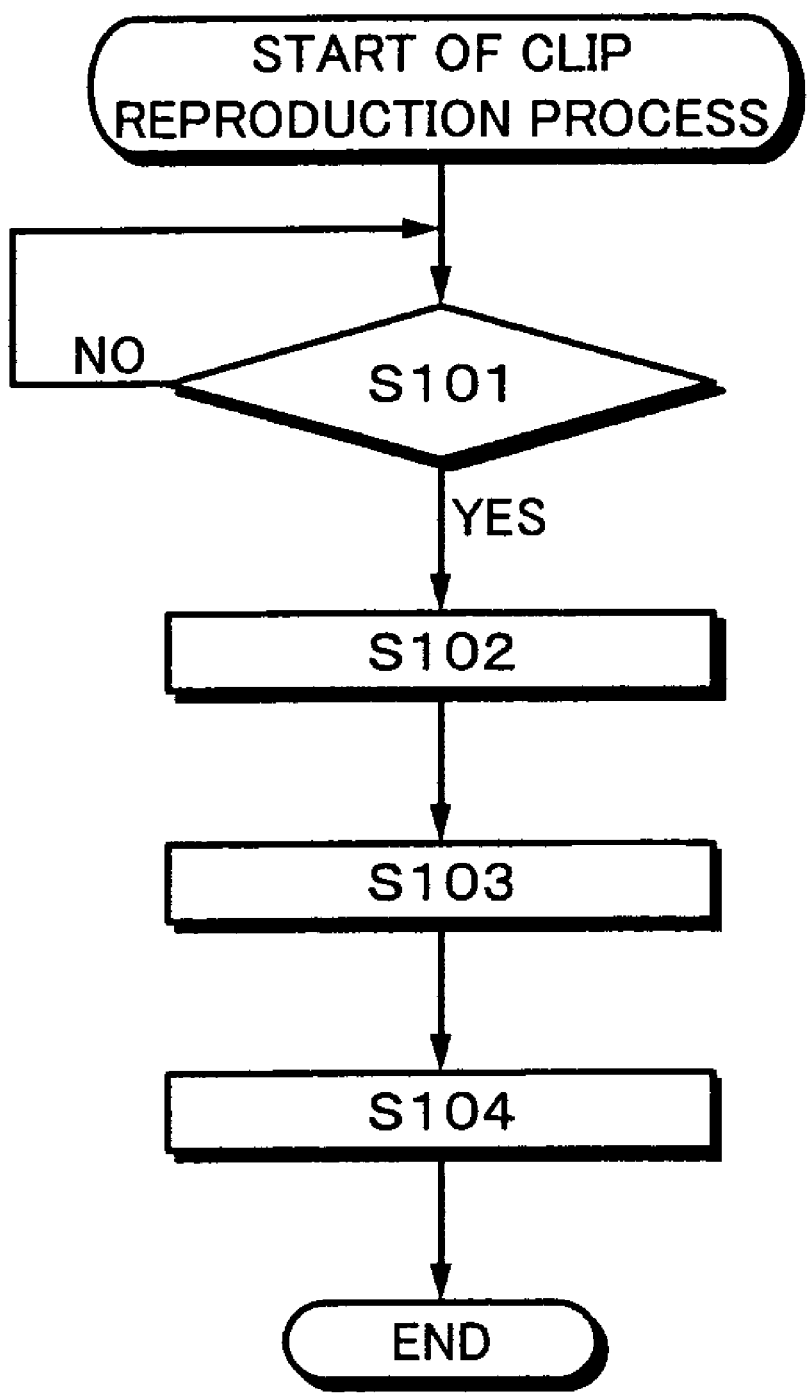
FIG. 19 is a flow chart describing a clip reproduction process of the photographing device shown in FIG. 1.

Next, with reference to a flow chart shown in FIG. 19, a clip reproduction process of the photographing device 14 will be described. In FIG. 19, the case of, which a clip is reproduced according to the clip information file will be described.

The photographing staff member operates a button or the like of the operation section 61 to check photographed clips and causes the photographing device 14 to reproduce his or her desired clip. As a result, the operation section 61 outputs a clip reproduction command signal to the CPU 51. When the CPU 51 has input the clip reproduction command signal through the operation section 61, the CPU 51 causes the reproduction control section 55 to start reproducing the clip from the optical disc 17.

At step S101 shown in FIG. 19, the clip reproduction section 111 waits until the clip reproduction start command has been issued from the CPU 51. When the clip reproduction section 111 has determined that the clip reproduction start command had been issued from the CPU 51, the flow advances to step S102. At step S102, the clip reproduction section 111 controls the clip information obtainment section 114 to read a designated clip information file (for example, the clip information file 151) from the optical disc 17 through the drive 66. The clip information obtainment section 114 stores (loads) the clip information file to the RAM 53. Thereafter, the flow advances to step S103.

At step S103, the clip reproduction section 111 controls the clip information obtainment section. 114 to obtain umid (for example, [umid: 060A2B3401010 10501010D12130000000123456789ABCDEF01234567 89ABCDEF], line 7, FIG. 14), attribute information (for example, [type="IMX50", line 8, FIG. 14, [type="LPCM16" trackDst="CH1", line 11, and so forth), and header size information (for example, [header="65536"], line 8, FIG. 14) of essence data to be reproduced from the clip information file stored in the RAM 53. The clip reproduction section 111 controls the index file information obtainment section 113 to obtain the file name (for example, [file="C0001V01.MXF"], line 3, FIG. 11) corresponding to the obtained umid from the clip table of the index file (for example, the index file 134) stored in the RAM 53. Thereafter, the flow advances to step S104.

At step S104, the clip reproduction section 111 controls the drive 66, the encoder/decoder section 56, and the output section 63 to reproduce essence data recorded on the optical disc 17 from the position of which the header size (for example, [header="65536"], line 8, FIG. 14) is removed from the beginning of the file (the file is sought for the header size) according to the attribute information obtained by the clip information obtainment section 114, the header size information, and the file name obtained by the index file information obtainment section 113 and completes the clip reproduction process.

Next, with reference to FIG. 20, the clip reproduction process shown in FIG. 19 will be described in detail. In the example shown in FIG. 20, the case of which essence data of clip 1 are reproduced will be described.

The clip reproduction section 111 obtains the position of an MXF data file of clip 1 recorded on the optical disc 17 according to the file name obtained by the index file information obtainment section 113 and controls the drive 66 to reproduce the MXF data file from the position of which the MXF data file is sought from the beginning for the header size obtained by the clip information obtainment section 114. Under this control, the drive 66 reads essence data of the file body from position A1 of which the header size is removed from the beginning of the MXF data file of clip 1 recorded on the optical disc 17 and supplies the obtained essence data to the encoder/decoder section 56. The encoder/decoder section 56 decodes the essence data according to the attribute information supplied from the clip reproduction section 111 and outputs the decoded data to the monitor and the speaker that compose the output section 63.

Figure 20:
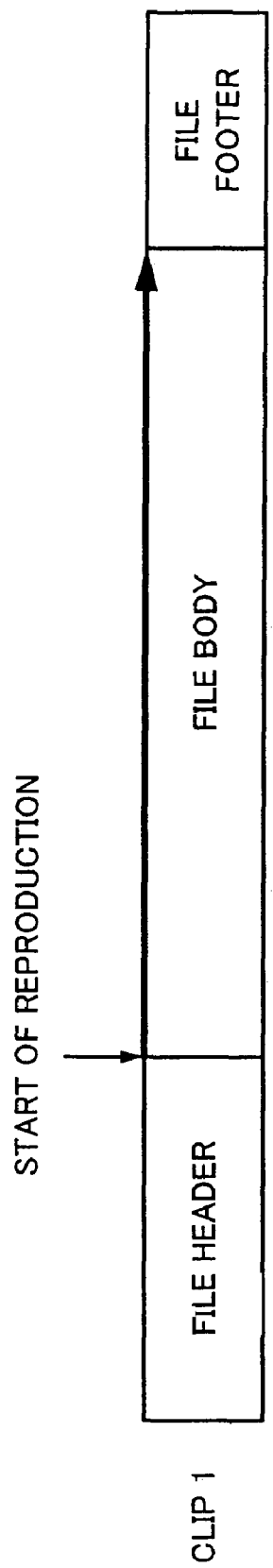
FIG. 20 is a schematic diagram describing the clip reproduction process shown in FIG. 19.

Thus, as shown in FIG. 20, the reproduction for essence data of the file body is started from position A1 (the beginning of the file body) of which the file header is removed from the MXF data file of clip 1 recorded on the optical disc 17. Thus, since the photographing device 14 does not need to read the file header, the reproduction process time is shortened.

Next, with reference to a flow chart shown in FIG. 21, a tape reproduction process of the photographing device 14 will be described.

The photographing staff member operates a button or the like of the operation section 61 to check all clips that he or she have photographed and to cause the photographing device 14 to performs the tape reproduction process. When the photographing device 14 uses a tape as a record medium and reproduces data therefrom, the data are successively reproduced in the order of which they were recorded. The tape reproduction process is a successive clip reproduction process that successively reproduces all clips from the optical disc 17 as if data were reproduced from the tape.

The operation section 61 outputs a tape reproduction command signal to the CPU 51. When the CPU 51 has input the tape reproduction command signal through the operation section 61, the CPU 51 causes the reproduction control section 55 to start the tape reproduction for the optical disc 17.

Figure 21:
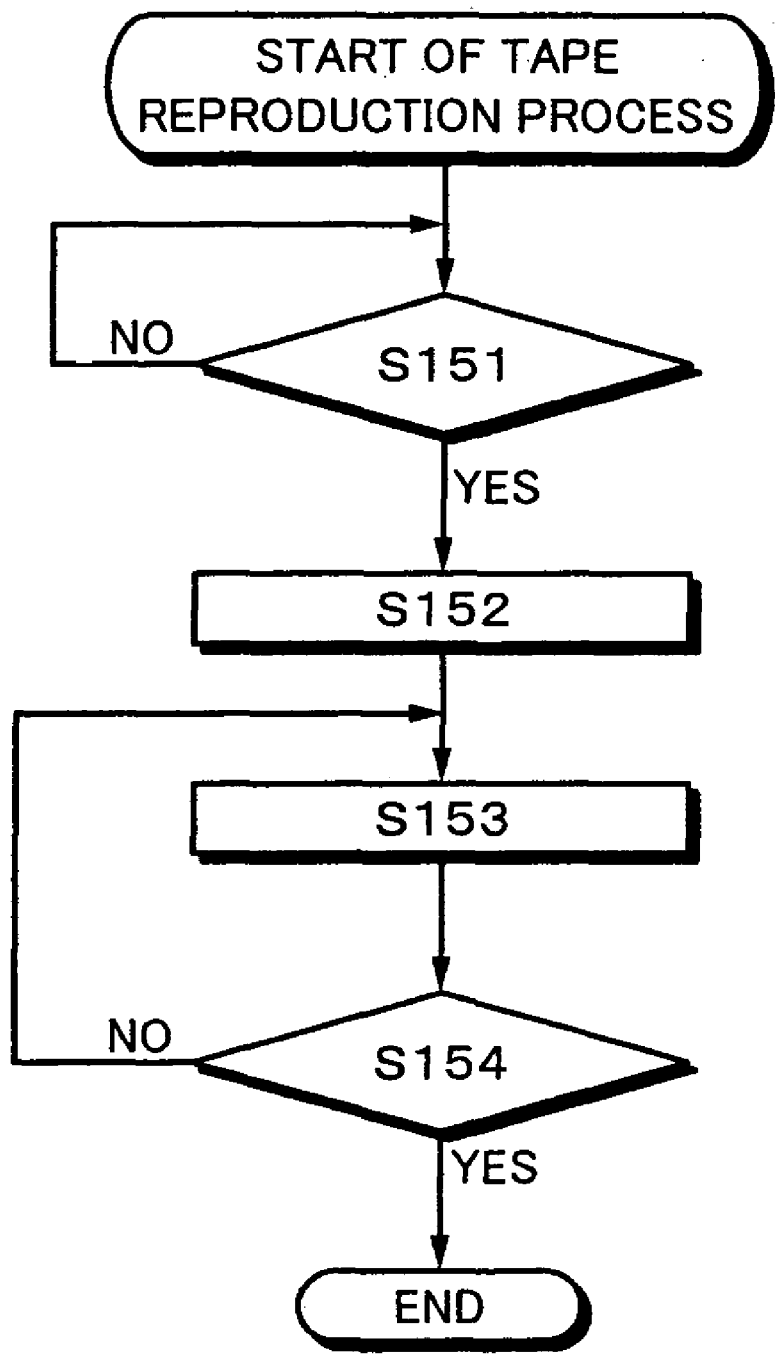
FIG. 21 is a flow chart describing a tape reproduction process of the photographing device shown in FIG. 1.

At step S151 shown in FIG. 21, the tape reproduction section 112 waits until the tape reproduction command has been issued from the CPU 51. When the tape reproduction section 112 has determined that the tape reproduction start command had been issued from the CPU 51, the flow advances to step S152. At step S152, the tape reproduction section 112 controls the index file information obtainment section 113 to obtain a first clip element from the clip table of the index file 134 stored in the RAM 53. The tape reproduction section 112 obtains the file name (for example, [file="C0001V01.MXF"], line 4, FIG. 11) of essence data to be reproduced, attribute information (for example, [type="DV25_411P], line 4, FIG. 11) necessary to reproduce the essence data, and the header size information (for example, [header="65536"], line 4, FIG. 11) from the obtained clip element. Thereafter, the flow advances to step S153.

At step S153, the tape reproduction section 112 controls the drive 66, the encoder/decoder section 56, and the output section 63 to reproduce essence data recorded on the optical disc 17 from the position of which the header size (for example, [header="65536"], line 4, FIG. 11) is removed from the beginning of the file (the file is sought for the header size) according to the attribute information, the header size information, and the file name obtained by the index file information obtainment section 113.

When the tape reproduction section 112 has completed the clip reproduction process at step S153, the flow advances to step S154. At step S154, the tape reproduction section 112 determines whether the reproduction process for all clip elements of the clip table of the index file have been completed according to information supplied from the index file information obtainment section 113. When the tape reproduction section 112 has determined that the clip table of the index file has a clip element that had not been reproduced, the flow returns to step S152. At step S152, the tape reproduction section 112 controls the index file information obtainment section 113 to obtain the next clip element from the clip table of the index file stored in the RAM 53 and repeats the process from the next step.

When the tape reproduction section 112 has determined that the reproduction process for all clip elements of the clip table of the index file had been completed, the tape reproduction section 112 completes the tape reproduction process.

Next, with reference to FIG. 22, the tape reproduction process shown in FIG. 21 will be described in detail. In the example shown in FIG. 22, the case of which essence data of clip 1 to clip 3 are successively reproduced will be described.

The tape reproduction section 112 obtains the position of the MXF data file of clip 1 recorded on the optical disc 17 according to the file name obtained by the index file information obtainment section 113 and controls the drive 66 to reproduce the MXF data file from the position of which the MXF file is sought from the beginning for the header size obtained by the index file information obtainment section 113. Under this control, the drive 66 reads essence data of the file body from position B1 of which the header size is removed from the beginning of the MXF data file of clip 1 recorded on the optical disc 17 for the header size and supplies the essence data to the encoder/decoder section 56. The encoder/decoder section 56 decodes the essence data according to the attribute information supplied from the tape reproduction section 112 and outputs the decoded data to the monitor and the speaker that compose the output section 63.

This process applies to clip 2 and clip 3. Thus, their detail description will be omitted. After the reproduction for clip 1 has been completed, the drive 66 reads essence data of the file body from position B2 of which the header size is removed from the beginning, of the MXF file of clip 1 recorded on the optical disc 17 under the control of the tape reproduction section 112 and supplies the obtained essence data to the encoder/decoder section 56. The encoder/decoder section 56 decodes the essence data according to the attribute information supplied from the tape reproduction section 112 and outputs the decoded data to the monitor and the speaker that compose the output section 63.

After the reproduction for clip 2 has been completed, the drive 66 reads essence data of the file body from position B3 of which the header size is removed from the beginning of the MXF file of clip 1 recorded on the optical disc 17 under the control of the tape reproduction section 112 and supplies the obtained essence data to the encoder/decoder section 56. The encoder/decoder section 56 decodes the essence data according to the attribute information supplied from the tape reproduction section 112 and outputs the decoded data to the monitor and the speaker that compose the output section 63.

Thus, as shown in FIG. 22, the reproduction for essence data of a file of clip 1 recorded on the optical disc 17 is started from position B1 of which the file header is removed from the essence data (namely, the beginning of the file body). After the reproduction for clip 1 has been completed, the reproduction for essence data of the file body is started from position B2 of which the file header is removed from the essence data of clip 2 (namely, the beginning of the file body). After the reproduction for clip 2 has been completed, the reproduction for essence data of the file body is started from position B3 of which the file header is removed from the essence data of clip 3 (namely, the beginning of the file body). After the reproduction of clip has been complete, the tape reproduction process is completed.

As described above, since the header size information of essence data of an MXF data file recorded on the optical disc 17 is managed, when essence data of the MXF data file is read from the optical disc 17, the read time for the file header of the MXF data file is shortened. Thus, the reproduction process time is shortened. As a result, the tape reproduction that successively reproduces a plurality of clips, when the reproduction changes from one clip to the next clip, no time lag takes place.

In the clip reproduction process shown in FIG. 19, a process that reproduces a clip according to the clip information file was described. Instead, a clip may be reproduced according to according to the index file.

In the tape reproduction shown in FIG. 21, a process that reproduce a tape according to the index file was described. Instead, a tape may be reproduced according to the clip information file. When the clip or tape reproduction is performed, if the reproduction is performed according to the clip information file instead of the index file, umid needs to be converted in the index file. Thus, the reproduction time becomes longer.

Thus, it is preferred that on an optical disc, the index file be referenced to shorten the reproduction process and that when other devices are used, the clip information file that is versatile be used.

In the foregoing example, the case of which video data, audio data, low resolution data, frame meta data, clip meta data, edit list, and so forth are recorded on an optical disc was described. As a record medium on which these types of data are recorded, besides the optical disc, an optical-magnetic disc, a magnetic disc such as a flexible disc or a hard disk, a magnetic tape, or a semiconductor memory such as a flash memory may be used.

In the foregoing, as data recorded on an optical disc, MXF composed of a file header, a file body, and a file footer was described. However, any file format of data recorded on an optical disc other than MXF may be used as long as the file format has a header.

In the foregoing, the case of which the photographing device 14 records and reproduces a clip was described. However, the information process apparatus that records and reproduce a clip may be other than the photographing device 14. For example, the information process apparatus may be the planning terminal device 11, the field PC 15, or the editing terminal device 16 shown in FIG. 1. Instead, the information process apparatus may be other than these devices.

As described above, in the information process apparatus according to the present invention, when a boy is recorded, reproduction information necessary to reproduce data is obtained. According to the reproduction information, a header is generated. The header is added to the body. As a result, data are generated. Header size information of the generated data is obtained. Management information of the data is composed of the obtained reproduction information and the header size information. The management information is registered to a management file that manages data. As long as these processes are performed, they may be preformed in any methods. In addition, another process may be performed along with these processes. The structure of the information process apparatus according to the present invention may be other than the structure shown in FIG. 2 as long as these processes can be executed.

The foregoing sequence of processes may be executed by hardware. As described above, these processes may be executed by software. When the sequence of processes are executed by software, the software is installed from a record medium or the like to a computer that has hardware in which a program that composes the software has been installed or a general-purpose personal computer that can install various types of programs and execute corresponding functions.

As shown in FIG. 2, the record medium is unaccompanied by the photographing device 14. The record medium is delivered to the user to provide the program. The record medium on which the program has been recorded is provided as a magnetic disc (including a flexible disc), an optical disc (including CD-ROM (Compact Disc-Read Only Memory), DVD (Digital Versatile Disc), an optical-magnetic disc (including MD (Mini-Disc) (registered trademark)), or the removable media 71 including a package medium composed of a semiconductor memory or the like. Instead, a computer in which the ROM 52 and the hard disk, including the storage section 63, that store the program has been installed may be provided to the user.

In this specification, steps that describe a program provided by a medium are executed sequentially in the order of which they are described. Instead, the steps may be executed in parallel or discretely.

In this specification, the system represents a whole apparatus composed of a plurality of devices.

As described above, according to the present invention, data can be smoothly reproduced. In addition, according to the present invention, a plurality of pieces of data can be successively and smoothly reproduced.

DESCRIPTION OF REFERENCE NUMERALS

1 VIDEO PROGRAM CREATION SUPPORT SYSTEM
11 PLANNING TERMINAL DEVICE
12 NETWORK
13 NEWS COLLECTION TERMINAL DEVICE
14 PHOTOGRAPHING DEVICE
15 FIELD PC
16 EDITING TERMINAL DEVICE
17 OPTICAL DISC
54 RECORD CONTROL SECTION
55 REPRODUCTION CONTROL SECTION
56 ENCODER/DECODER SECTION
66 DRIVE
101 DATA OBTAINMENT SECTION
102 INFORMATION OBTAINMENT SECTION
103 DATA GENERATION SECTION
104 CLIP GENERATION SECTION
105 INDEX FILE UPDATE SECTION
106 DATA RECORD SECTION
107 TABLE RECORD SECTION
111 CLIP REPRODUCTION SECTION
112 TAPE REPRODUCTION SECTION
113 INDEX FILE INFORMATION OBTAINMENT SECTION
114 CLIP INFORMATION OBTAINMENT SECTION
134 INDEX FILE
151 CLIP INFORMATION FILE
S1 HAS DISC BEEN LOADED ?
S2 READ INDEX FILE.
S21 HAS DATA RECORD START COMMAND BEEN ISSUED ?
S22 OBTAIN PARAMETER INFORMATION.
S23 GENERATE CLIP DIRECTORY.
S24 GENERATE EACH FILE OF ESSENCE DATA.
S25 GENERATE FRAME META DATA FILE.
S26 GENERATE CLIP META DATA FILE.
S27 GENERATE PICTURE POINTER FILE.
S28 OBTAIN HEADER SIZE OF ESSENCE DATA.
S29 GENERATE CLIP INFORMATION FILE ACCORDING TO HEADER SIZE AND PARAMETER INFORMATION.
S30 UPDATE PROCESS FOR INDEX FILE
S41 GENERATE CLIP ELEMENT DESCRIBING UMID AND FILE NAME OF CLIP.
S42 DESCRIBE ATTRIBUTE INFORMATION IN CLIP ELEMENT ACCORDING TO PARAMETER INFORMATION.

S43 GENERATE CLIP CHILD ELEMENT DESCRIBING UMID AND FILE NAME OF ESSENCE DATA OF CLIP.
S44 DESCRIBE ATTRIBUTE INFORMATION IN CLIP CHILD ELEMENT ACCORDING TO PARAMETER INFORMATION.
S45 DESCRIBE HEADER SIZE IN CLIP CHILD ELEMENT.
S46 ADD CLIP ELEMENT AND CLIP CHILD ELEMENT TO CLIP TABLE.
S101 HAS CLIP REPRODUCTION START COMMAND BEEN ISSUED ?
S102 READ DESIGNATED CLIP INFORMATION FILE.
S103 OBTAIN FILE NAME CORRESPONDING TO UMID OF ESSENCE DATA TO BE REPRODUCED FROM INDEX FILE.
S104 REPRODUCE ESSENCE DATA FROM POSITION OF WHICH HEADER SIZE IS REMOVED FROM ESSENCE DATA OF OBTAINED FILE NAME.
S151 HAS TAPE REPRODUCTION COMMAND BEEN ISSUED ?
S152 OBTAIN CLIP ELEMENT OF CLIP TABLE.
S153 REPRODUCE ESSENCE DATA FROM POSITION OF WHICH HEADER SIZE IS REMOVED FROM ESSENCE DATA OF CORRESPONDING CLIP ELEMENT.
S154 HAS PROCESS FOR ALL CLIPS BEEN COMPLETED ?

The invention claimed is:

1. An information process apparatus that manages data recorded on a record medium, the data being composed of a header and a body, the information process apparatus comprising:
reproduction information obtainment means for obtaining reproduction information necessary to reproduce the data when the body is recorded;
data generation means for generating the header according to the reproduction information obtained by the reproduction information obtainment means and adding the header to the body so as to generate the data;
header information obtainment means for obtaining header size information of the data generated by the data generation means;
management file generation means for generating a first management file that manages each clip of data that compose the clip recorded on the record medium with an identifier that uniquely identifies data that compose the clip, the first management file describing the reproduction information of data that compose the clip obtained by the reproduction information obtainment means and the header size information of each type of essence data of each clip obtained by the header information obtainment means, each clip being a predetermined structural unit of data; and
management file registration means for registering management information of the clip, the management information being composed of the reproduction information of data that compose the clip and the header size information to a second management file that totally manages the clip recorded on the record medium with an identifier that uniquely identifies data that compose the clip and information that represents the recorded position of data that compose the clip.

2. The information process apparatus as set forth in claim 1, further comprising:
first data information obtainment means for obtaining the header size information of data that compose the clip from the first management file generated by the management file generation means;
second data information obtainment means for obtaining the header size information of data that compose the clip from the second management file in which management information of the clip is registered by the management file registration means; and
reproduction means for reproducing data that compose the clip from the position of which the header size is removed from the beginning of the data according to the header size information obtained by the first or second data information obtainment means.

3. The information process apparatus as set forth in claim 1, further comprising:
first data information obtainment means for obtaining the header size information of data that compose the clip from the first management file generated by the management file generation means;
second data information obtainment means for obtaining the header size information of data that compose the clip from the second management file in which management information of the clip is registered by the management file registration means; and
successive reproduction means for successively reproducing data that compose all clips recorded on the record medium from the position of which the header size is removed from the beginning of the data according to the header size information obtained by the first or second data information obtainment means.

4. An information process method of managing data recorded on a record medium, the data being composed of a header and a body, the information process method comprising the steps of:
obtaining reproduction information necessary to reproduce the data when the body is recorded;
generating the header according to the reproduction information obtained by a process of the reproduction information obtainment step and adding the header to the body so as to generate the data;
obtaining header size information of the data generated by a process of data generation step;
generating a first management file that manages each clip of data that compose the clip recorded on the record medium with an identifier that uniquely identifies data that compose the clip, the first management file describing the reproduction information of data that compose the clip obtained by a process of the reproduction information obtainment step and the header size information of each type of essence data of each clip obtained by a process of the header information obtainment step, each clip being a predetermined structural unit of data; and
registering management information of the clip, the management information being composed of the reproduction information of data that compose the clip and the header size information to a second management file that totally manages the clip recorded on the record medium with an identifier that uniquely identifies data that compose the clip and information that represents the recorded position of data that compose the clip.

5. A non-transitory computer-readable record medium storing a program that when executed on a computer causes the computer to execute an information process that manages data recorded on a record medium, the data being composed of a header and a body, the program comprising the steps of:
obtaining reproduction information necessary to reproduce the data when the body is recorded;

generating the header according to the reproduction information obtained by a process of the reproduction information obtainment step and adding the header to the body so as to generate the data;

obtaining header size information of the data generated by a process of data generation step;

generating a first management file that manages each clip of data that compose the clip recorded on the record medium with an identifier that uniquely identifies data that compose the clip, the first management file describing the reproduction information of data that compose the clip obtained by a process of the reproduction information obtainment step and the header size information, of of each type of essence of each clip obtained by a process of the header information obtainment step, each clip being a predetermined structural unit of data; and registering management information of the clip, the management information being composed of the reproduction information of data that compose the clip and the header size information to a second management file that totally manages the clip recorded on the record medium with an identifier that uniquely identifies data that compose the clip and information that represents the recorded position of data that compose the clip.

6. A program embodied in a non-transitory computer-readable medium that when executed on a computer causes an information process that manages data recorded on a record medium, the data being composed of a header and a body, said program comprising the steps of:

obtaining reproduction information necessary to reproduce the data when the body is recorded;

generating the header according to the reproduction information obtained by a process of the reproduction information obtainment step and adding the header to the body so as to generate the data;

obtaining header size information of the data generated by a process of data generation step;

generating a first management file that manages each clip of data that compose the clip recorded on the record medium with an identifier that uniquely identifies data that compose the clip, the first management file describing the reproduction information of data that compose the clip obtained by a process of the reproduction information obtainment step and the header size information of each type of essence data of each clip obtained by a process of the header information obtainment step, a predetermined structural unit of data; and registering management information of the clip, the management information being composed of the reproduction information of data that compose the clip and the header size information to a second management file that totally manages the clip recorded on the record medium with an identifier that uniquely identifies data that compose the clip and information that represents the recorded position of data that compose the clip.

* * * * *